United States Patent
Shindo et al.

(10) Patent No.: US 10,052,726 B2
(45) Date of Patent: Aug. 21, 2018

(54) METHOD FOR CREATING MACHINING DATA FOR USE IN HYBRID ULTRAPRECISION MACHINING DEVICE, AND HYBRID ULTRAPRECISION MACHINING DEVICE

(71) Applicant: PANASONIC INTELLECTUAL PROPERTY MANAGEMENT CO., LTD., Osaka (JP)

(72) Inventors: Takashi Shindo, Osaka (JP); Yoshiyuki Uchinono, Osaka (JP); Kimitake Okugawa, Osaka (JP); Noboru Urata, Osaka (JP); Syoji Kuroki, Osaka (JP); Akira Fukuoka, Osaka (JP); Atsushi Sakaguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 488 days.

(21) Appl. No.: 14/343,417

(22) PCT Filed: Dec. 14, 2012

(86) PCT No.: PCT/JP2012/083170
§ 371 (c)(1),
(2) Date: Mar. 7, 2014

(87) PCT Pub. No.: WO2013/089279
PCT Pub. Date: Jun. 20, 2013

(65) Prior Publication Data
US 2015/0025667 A1    Jan. 22, 2015

(30) Foreign Application Priority Data
Dec. 14, 2011  (JP) .................. 2011-273091

(51) Int. Cl.
*G05B 19/418* (2006.01)
*B23P 15/24* (2006.01)
(Continued)

(52) U.S. Cl.
CPC ............ *B23P 15/24* (2013.01); *B23K 26/36* (2013.01); *B23P 23/02* (2013.01); *B23B 27/20* (2013.01);
(Continued)

(58) Field of Classification Search
CPC ............ G05B 2219/50087; G05B 2219/45149
(Continued)

(56) References Cited

U.S. PATENT DOCUMENTS 5,525,776 A * 6/1996 Okamoto .......... B23K 26/0093
                                              219/121.68
5,532,933 A    7/1996 Nakata
(Continued)

FOREIGN PATENT DOCUMENTS

CN         1772428       5/2006
CN        101082770     12/2007
(Continued)

OTHER PUBLICATIONS

Tonshoff et al., "Advanced 3D-CAD-Interface for Micro Machining with Excimer Lasers" Proc. SPIE 3680, Design, Test, and Microfabrication of MEMS and MOEMS, 340 (Mar. 10, 1999) pp. 340-348.*

(Continued)

*Primary Examiner* — Emilio J Saavedra
(74) *Attorney, Agent, or Firm* — Greenblum & Bernstein, P.L.C.

(57) ABSTRACT

There is provided a method for creating machining data for a hybrid ultraprecision machining device for manufacturing a micro-machined product from a workpiece, the machining
(Continued)

device comprising: an electromagnetic-wave-machining means for roughly machining the workpiece; a precision-machining means for precisely machining the roughly machined workpiece; and a shape-measurement means, wherein the creation of the machining data makes use of: information on original shape corresponding to shape of the workpiece; information on roughly-machining shape to be removed from the workpiece by the electromagnetic-wave-machining means; and stereoscopic model of after-electromagnetic-wave-machining shape which is obtained by subtracting the roughly-machining shape from the original shape, wherein the machining data is created for electromagnetic-wave machining on the basis of information on a plurality of sliced portions obtained by partially slice-cutting from the stereoscopic model of the after-electromagnetic-wave-machining shape.

20 Claims, 28 Drawing Sheets

(51) Int. Cl.
*B23K 26/36* (2014.01)
*B23P 23/02* (2006.01)
*B23C 3/20* (2006.01)
*B23B 27/20* (2006.01)

(52) U.S. Cl.
CPC ........... *B23B 2260/108* (2013.01); *B23C 3/20* (2013.01); *G05B 2219/37578* (2013.01); *G05B 2219/45149* (2013.01); *G05B 2219/50087* (2013.01)

(58) Field of Classification Search
USPC .......................................................... 700/98
See application file for complete search history.

(56) References Cited

U.S. PATENT DOCUMENTS

| | | |
|---|---|---|
| 5,665,134 A | 9/1997 | Kirby et al. |
| 6,043,452 A | 3/2000 | Bestenlehrer |
| 7,862,761 B2 | 1/2011 | Okushima et al. |
| 2003/0040834 A1* | 2/2003 | Coleman ............ G05B 19/4099 700/191 |
| 2006/0102608 A1 | 5/2006 | Katsuta et al. |
| 2007/0278712 A1 | 12/2007 | Okushima et al. |
| 2014/0008340 A1 | 1/2014 | Urata et al. |

FOREIGN PATENT DOCUMENTS

| | | |
|---|---|---|
| DE | 69629756 T2 | 7/2004 |
| EP | 0425674 | 5/1991 |
| JP | 02-109657 | 4/1990 |
| JP | 6-210530 | 8/1994 |
| JP | 6-266427 | 9/1994 |
| JP | 9-225947 | 9/1997 |
| JP | 2703616 | 1/1998 |
| JP | 10-508256 | 8/1998 |
| JP | 11-285924 | 10/1999 |
| JP | 11285924 A * | 10/1999 |
| JP | 2001-79854 | 3/2001 |
| JP | 2004-106049 | 4/2004 |
| JP | 2007-83285 | 4/2007 |
| JP | 2008-200761 | 9/2008 |

OTHER PUBLICATIONS

English translation of International Preliminary Report on Patentability for PCT/JP2012/083170, and Notification of Transmittal thereof, dated Jun. 26, 2014.

International Search Report in PCT/JP2012/083170, dated Apr. 9, 2013, together with an English language translation thereof.

U.S. Appl. No. 14/343,428 to Takashi Shindo et al., filed Mar. 7, 2014.

Office Action in corresponding German Patent Application No. 112012003796.0, dated Dec. 7, 2016.

Office Action issued in China Patent Appl. No. 201280043553.4, dated Sep. 8, 2015, along with an english translation thereof.

* cited by examiner

Metal mold for optical lens

Fig. 6
Shaper machining
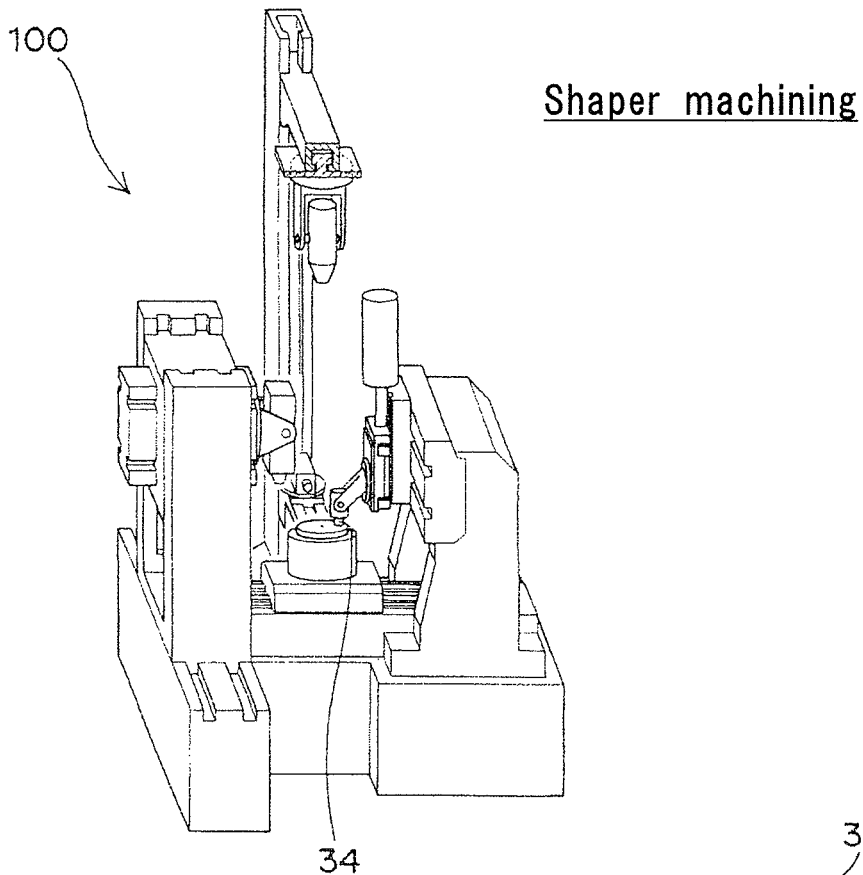
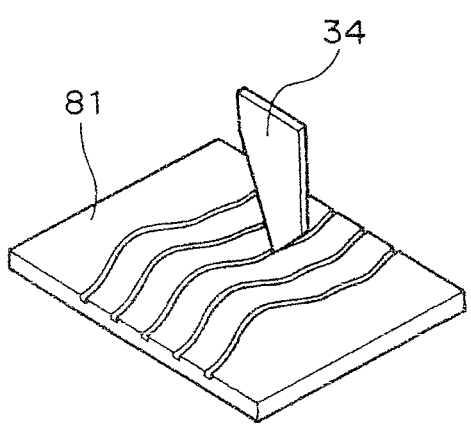
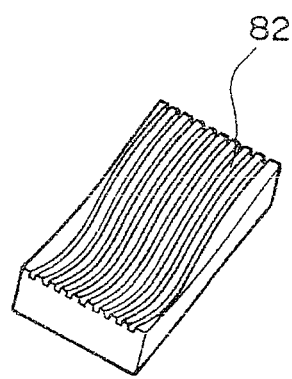

*Fig. 7*
Fly-cut machining
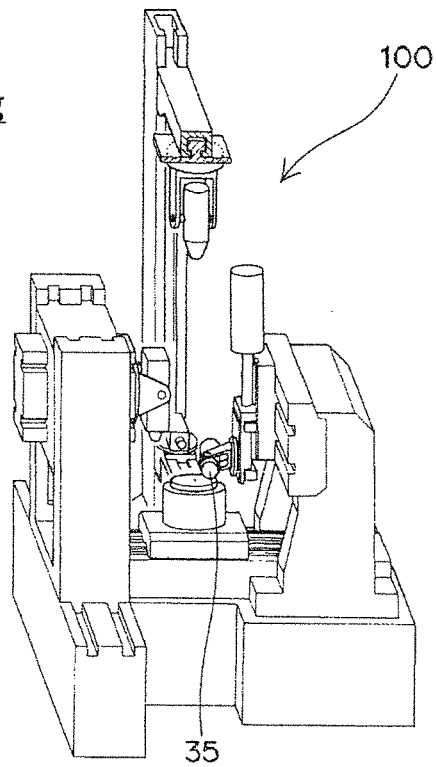
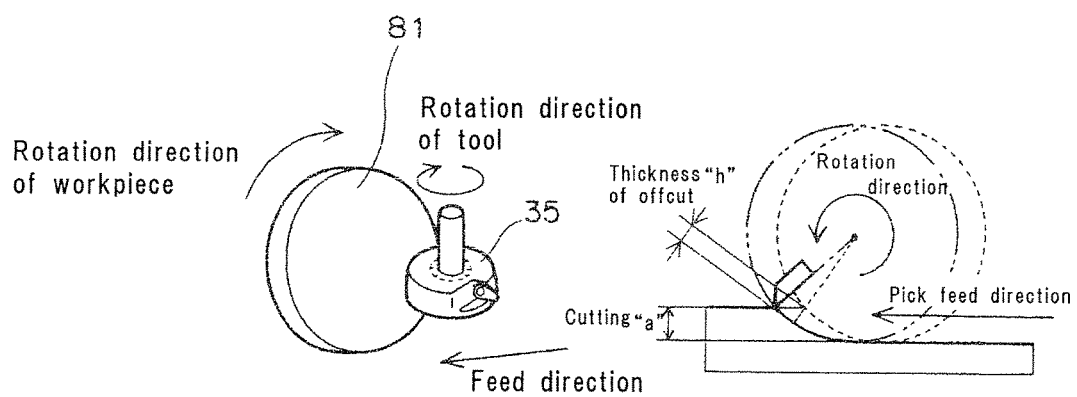

Fig. 8
Diamond-turning machining
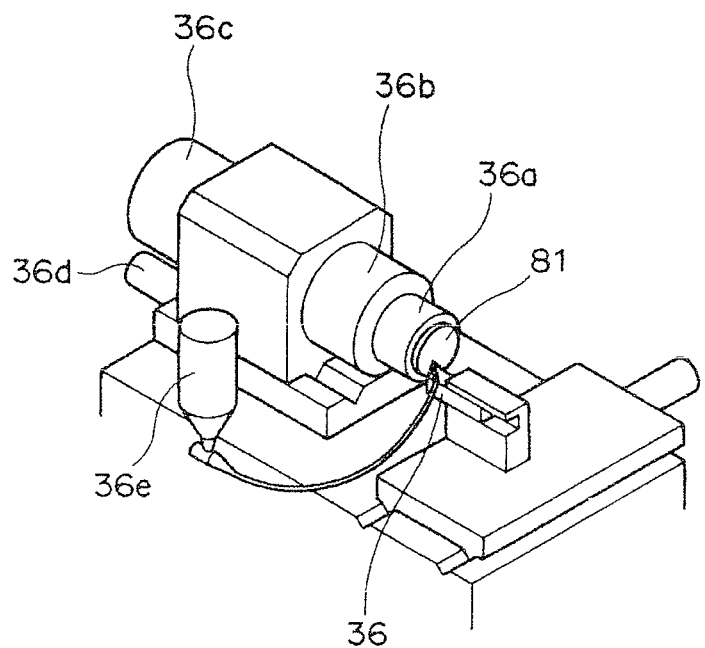
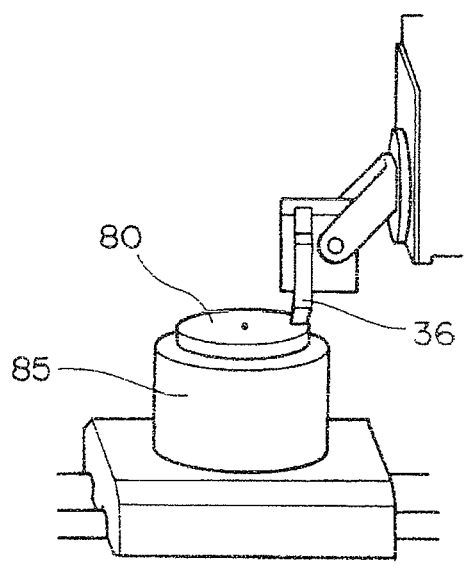

Fig. 9
Micro-milling machining
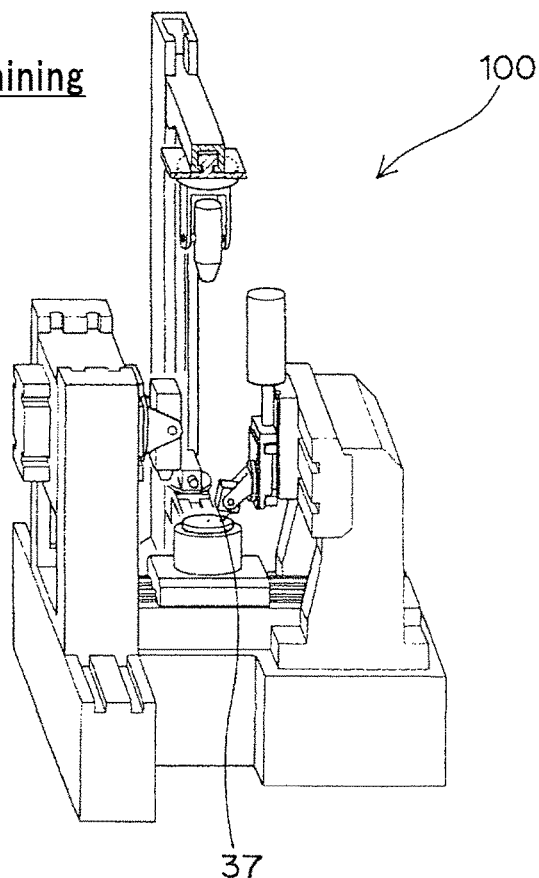
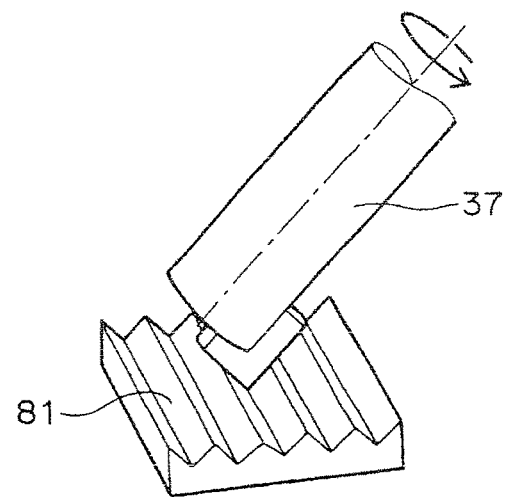

Fig. 10
Vibration cutting
(a) 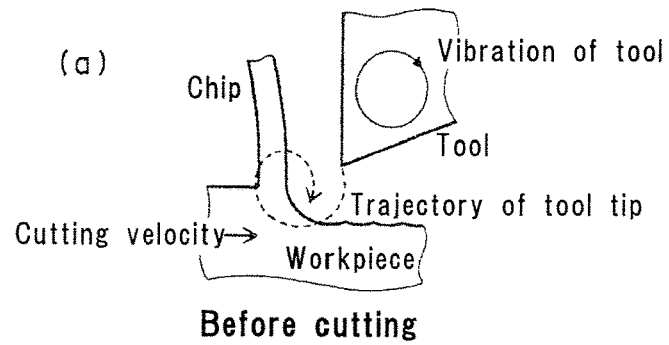
Before cutting
(b) 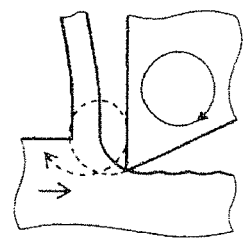
Starting of cutting
(c) 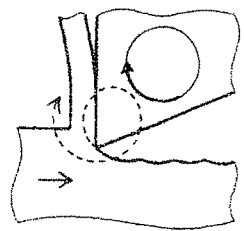
During cutting
(d) 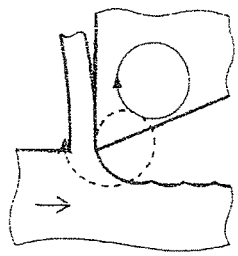
Completion of cutting Onboard measurement Onboard measurement Fig. 17
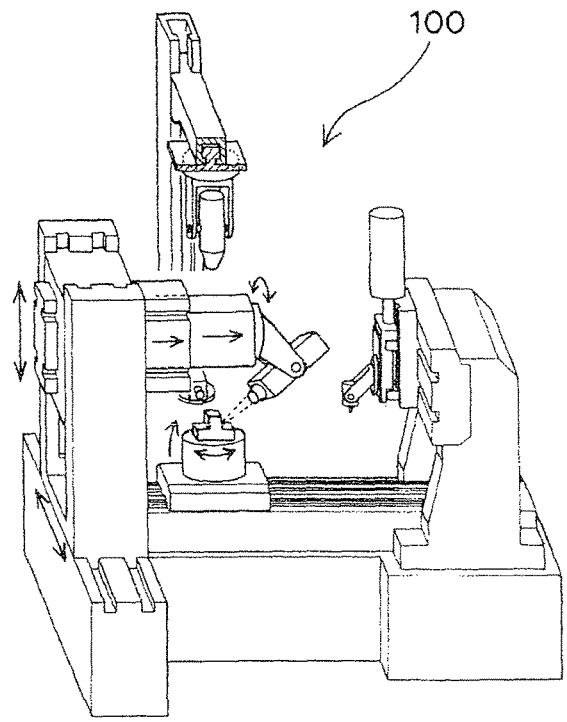
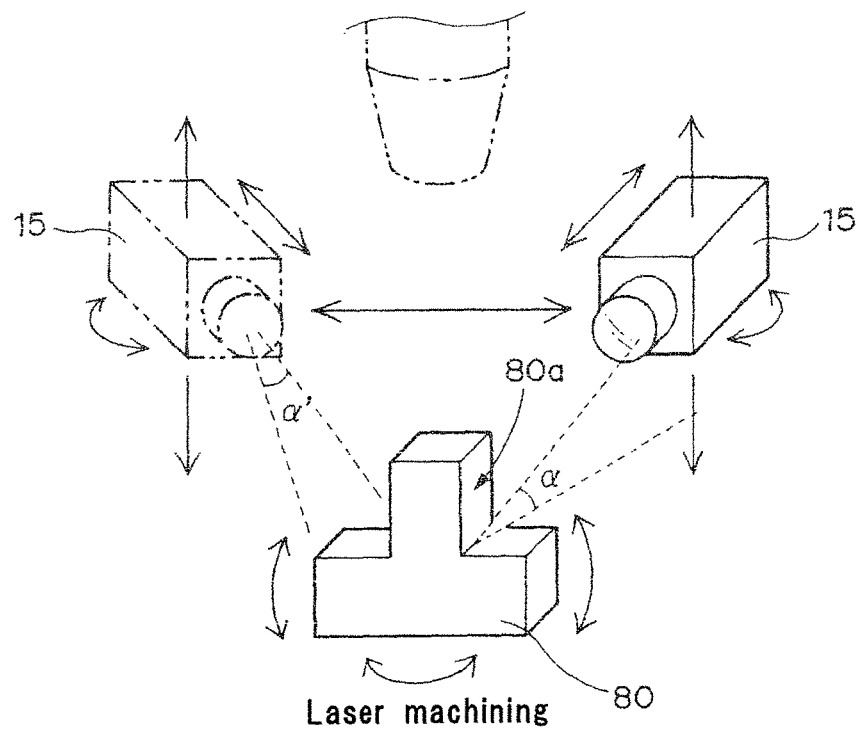
Laser machining Fig. 18
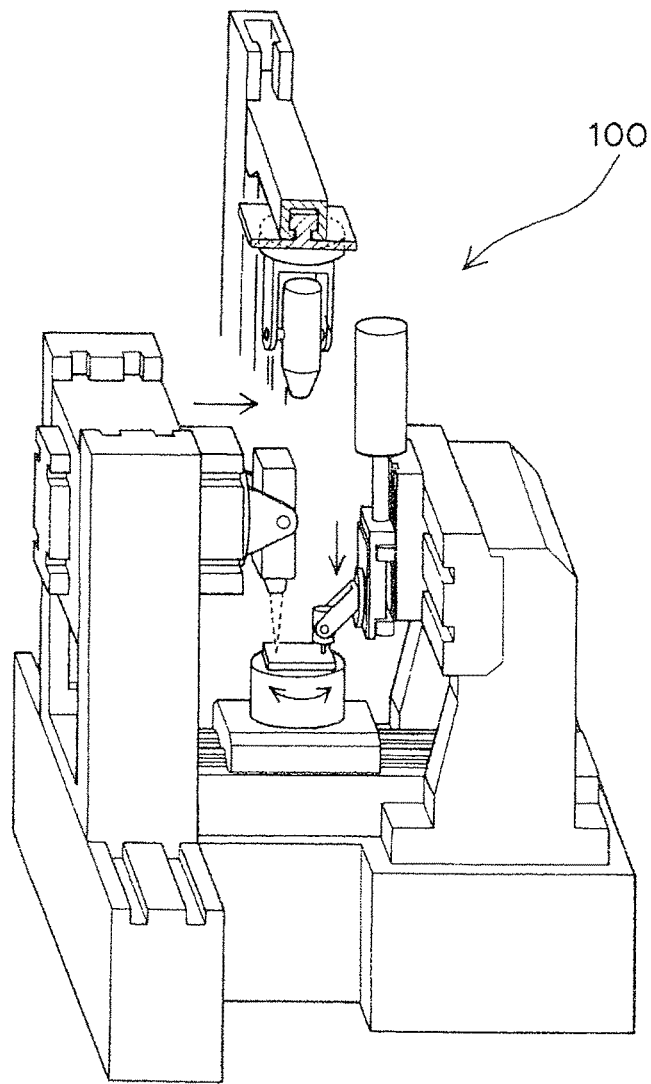
Top plan view
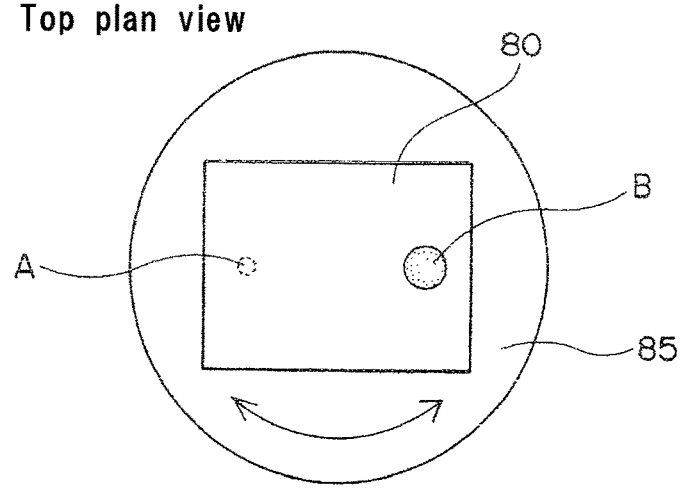

"Laser machining" is performed as electromagnetic-wave machining
("MC": Precision Machining)

Original shape of workpiece

Roughly-machining shape to be removed by electromagnetic-wave-machining means

Stereoscopic model of after-electromagnetic-wave-machining shape

Present invention

Prior-art

Electromagnetic-wave-machining means, precision-machining means and/or shape-measurement means Fig. 27
Grinding
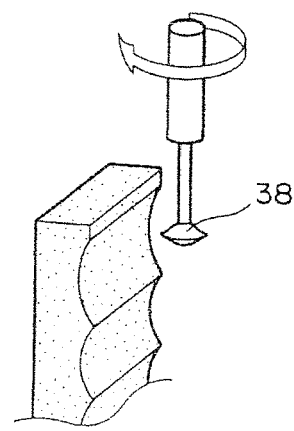
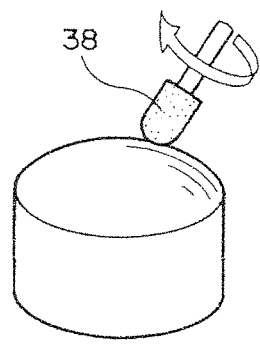
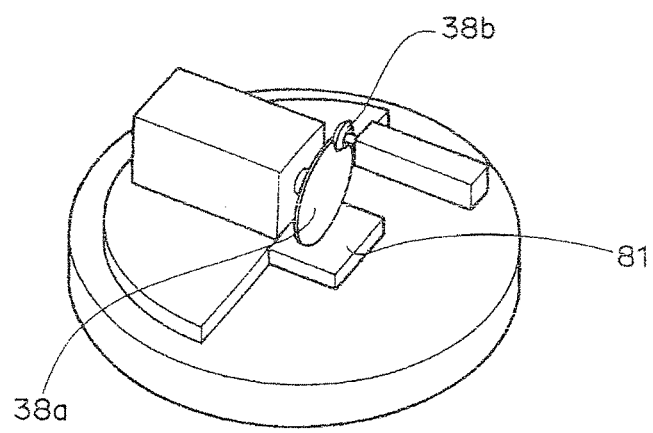

Case "A"

Case "B"

Fig. 29

◆ Simulation model

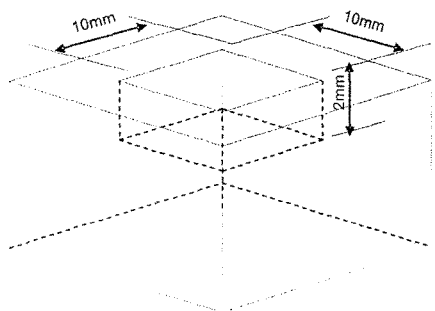

| | | |
|---|---|---|
| Slicing | Layer | 1000 layer |
| | Thickness of one layer | 2 um |
| | Machinable depth | 20 um |
| Laser | Scan velocity | 600 mm/s |
| | Scan pitch | 10 um |
| Z aixs | Feed time | 0.5 s/layer |

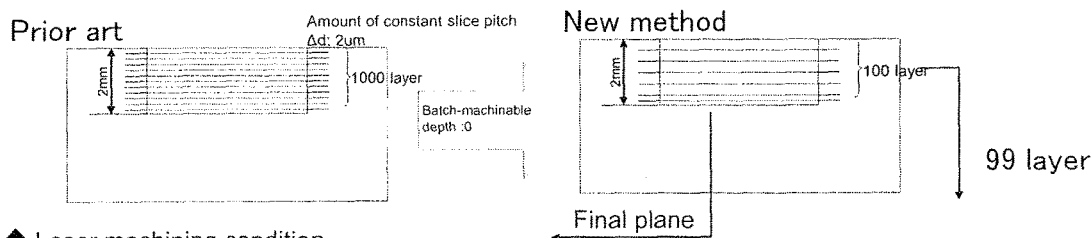

Prior art — Amount of constant slice pitch Δd: 2μm, 1000 layer, Batch-machinable depth :0

New method — 100 layer, Final plane, 99 layer

◆ Laser machining condition

Scan velocity: 600mm/s
Line pitch: 10um

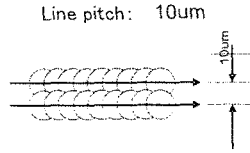

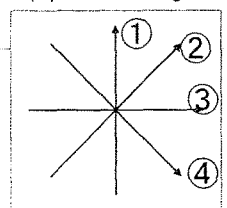
Direction of laser machining
(Upon machining for finished plane)

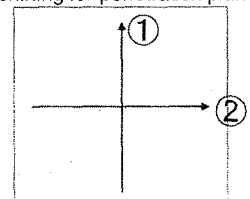
Direction of laser machining
(Upon machining for penetration plane)

Prior art

| | | |
|---|---|---|
| Z-axis driving time | 500 | s |
| Machining time for one layer | 66.66667 | s |
| Total machining time | 67166.67 | s |

| | |
|---|---|
| Number of machining line | 1000 lines |
| Number of plane forming line | 4000 lines |
| Length of machining line | 40000 mm |

New method

| | | |
|---|---|---|
| Z-axis driving time | 50 | s |
| Machining time for one layer | 33.33333 | s |
| Total machining time | 3416.667 | s |

| | |
|---|---|
| Number of layer-feed | 100 |
| Number of machining line | 1000 lines |
| | 2000 lines |
| Length of machining line | 20000 mm |

METHOD FOR CREATING MACHINING DATA FOR USE IN HYBRID ULTRAPRECISION MACHINING DEVICE, AND HYBRID ULTRAPRECISION MACHINING DEVICE

TECHNICAL FIELD

The present invention relates to a method for creating machining data for use in a hybrid ultraprecision machining device, and also a hybrid ultraprecision machining device. More particularly, the present invention relates to the hybrid ultraprecision machining device for obtaining a micro-machined product from a workpiece by hybrid ultraprecision machining, and also the method for creating the machining data for use in such device.

BACKGROUND OF THE INVENTION

In general industrial fields, machining processes have been traditionally performed to partially cut a material body (e.g., the body made of metal, wood or plastic) such that the body has a desired shape. For example, the cutting processes such as turning, milling and planning are performed to produce desired products or parts.

In a mass production of complicated products and parts, a metal mold for molding is generally manufactured by the machining process, for example. The metal mold is used for providing various types of molded products. Recently, electric devices and electronic devices have been decreasing their sizes and also have been improving their functions every year, which obviously requires miniaturization and high functionality of parts used in such devices. Therefore, the metal molds for molding such various parts or products having the requirements of the miniaturization and the high functionality are correspondingly required to be manufactured by the machining process with a sufficient accuracy of the miniaturization.

PATENT DOCUMENTS (PRIOR ART PATENT DOCUMENTS)

PATENT DOCUMENT 1: Japanese Unexamined Patent Application Publication No. H09-225947
PATENT DOCUMENT 2: Japanese Unexamined Patent Application Publication No. 2001-79854

DISCLOSURE OF THE INVENTION

Problems to be Solved by the Invention

The conventional machinings, however, cannot be satisfactorily addressed for the metal molds requiring the miniaturization of recent years. For example in a case where the metal molds are manufactured by machining difficult-to-cut materials such as ultrahard material and hardened steel, there is some concern that a lifetime of a machining tool is shortened, thus resulting in an increase in a manufacturing cost and a machining time. This becomes pronounced as the metal molds are more miniaturized and finer. For this reason, a shape design of the molded products (i.e., the shape design of the metal mold or the final product) is forced to be changed from a practical point of view.

There can be an attempt that the type of the cutting tools is appropriately selected. However, the cutting tool has to be in contact with the workpiece during the cutting process, which still shortens the lifetime of the tool and also still takes much more time. There can be another attempt that a non-contact machining process (e.g., laser machining) is utilized. However, the laser machining is regarded as a heat generation process which is attributed to an absorption of laser beam in the workpiece, and thus the laser machining is not appropriate for a high accuracy machining. More particularly, the laser machining is generally regarded as being not used for fine products having the accurate requirements of surface roughness and shape.

In an actual machining process wherein a three dimensional convexoconcave is shaped with respect to the workpiece, it is common practice to machine the workpiece while feeding it sequentially in the thickness direction thereof under a constant feed condition. In other words, the machining process is performed in accordance with a preset constant amount of feed provided by a preliminarily-created machining data, in which the level of the workpiece is sequentially changed in the thickness direction of the workpiece under the constant feed condition. However, in some cases, no machining process or a small extent of machining process may suffice for a certain machining shape. On the other hand, a greatly deep machining may also be required for another machining shape. Therefore, the machining data on the preset constant amount of feed does not necessarily satisfy these needs of the actual machining process.

Under these circumstances, the present invention has been created. That is, the present invention is directed to provide a method for creating machining data for use in a machining device which is suitable for the manufacturing of a miniaturized product (particularly, a micro product with a fine structure). The present invention is also directed to provide a hybrid ultraprecision machining device equipped with a system in which the above machining data is stored.

Means for Solving the Problems

In light of the above, the present invention provides a method for creating machining data for use in a hybrid ultraprecision machining device for manufacturing a micro-machined product from a workpiece, the machining device comprising:
an electromagnetic-wave-machining means (i.e., electromagnetic-wave-machining device) for roughly machining the workpiece;
a precision-machining means (i.e., precision-machining device) for precisely machining the roughly machined workpiece; and
a shape-measurement means (i.e., shape-measurement device) for measuring a shape of the workpiece upon use of the electromagnetic-wave machining means and the precision-machining means,
wherein the creation of the machining data makes use of:
information on an original shape corresponding to a shape of the workpiece;
information on a roughly-machining shape to be removed from the workpiece by the electromagnetic-wave-machining means; and
a stereoscopic model of an after-electromagnetic-wave-machining shape which is obtained by subtracting the roughly-machining shape from the original shape,
wherein the machining data is created for an electromagnetic-wave machining on the basis of information on a plurality of sliced portions which are obtained by partially cutting from the stereoscopic model of the after-electromagnetic-wave-machining shape such that the stereoscopic model is sliced.

In a preferred embodiment, a machining portion for the electromagnetic-wave-machining means is extracted on the basis of forms of roughly-machining regions emerged in the plurality of sliced portions. More specifically, the plurality of sliced portions are obtained by partially cutting from the stereoscopic model such that the stereoscopic model is sequentially sliced in the direction from the surface thereof toward the interior thereof. Then, the machining portion for the electromagnetic-wave-machining means is extracted by determining whether or not the roughly-machining region of each of the sliced portions has a penetration form penetrating through the each of the sliced portions. For example, when the roughly-machining region of the each of the sliced portions has the penetration form penetrating through the each of the sliced portions, data on the each of the sliced portions is combined with another data on an adjacent one of the sliced portions to create the machining data on a batch machining serving as a primary rough machining of the electromagnetic-wave machining. While on the other hand, when the roughly-machining region of the each of the sliced portions does not have the penetration form penetrating through the each of the sliced portions, data on the each of the sliced portions is provided with a condition of a finish machining to create the machining data, the finish machining serving as a secondary rough machining of the electromagnetic-wave machining.

Upon the creating of the machining data on the batch machining serving as the primary rough machining of the electromagnetic-wave machining, or upon the creating the machining data by adding thereto the condition of the finish machining serving as the secondary rough machining of the electromagnetic-wave machining, it is preferable to refer the data on the each of the sliced portions to a preliminarily-prepared database.

It is preferred that the extraction of the machining portion is performed by each of enclosed regions defined as the roughly-machining regions emerged in the each of the sliced portions. In other words, it is preferred that the machining portions are extracted in respective ones of enclosed regions emerged in the each of the sliced portions.

It is also preferred that, in accordance with the machining data, the hybrid ultraprecision machining device establishes a feed (i.e., feed-in amount) of a rough machining performed by the electromagnetic-wave-machining means and/or an electromagnetic-wave-machining condition of the electromagnetic-wave-machining means.

With respect to the hybrid ultraprecision machining device for which the creating method of the machining data according to the present invention is used, the electromagnetic-wave-machining means may be a laser-machining means. The precision-machining means may be equipped with a replaceable cutting tool selected from a group consisting of a planar tool, a shaper tool, a fly-cut tool, a diamond-turning tool and a micro-milling tool.

Moreover, the hybrid ultraprecision machining device further comprises a control means (i.e., controlling unit) for controlling the electromagnetic-wave-machining means or the precision-machining means, based on information on the shape of the workpiece, the shape being measured by the shape-measuring means.

In a preferred embodiment, a micro part of the micro-machined product has a dimension of several tens of nm to several mm, that is, the dimension of about 10 nm to about 15 mm, or about 10 nm to about 3 mm. For example, the dimension of the micro part of the micro-machined product is in the range of 10 nm to 500 μm, 50 nm to 1 μm, or 1 nm to 1 μm in some cases. Examples of the micro-machined products with the micro part dimensions include a metal mold for an optical lens, and an optical lens.

The present invention also provides a hybrid ultraprecision machining device. This is a device for manufacturing a micro-machined product from a workpiece, the machining device comprising:

an electromagnetic-wave-machining means for roughly machining the workpiece;

a precision-machining means for precisely machining the roughly machined workpiece; and a shape-measurement means for measuring a shape of the workpiece upon use of the electromagnetic-wave machining means and the precision-machining means, the machining device further comprising a system provided with a memory in which machining data for the machining device is stored, the machining data is an electromagnetic-wave-machining data obtained by use of:

information on an original shape corresponding to a shape of the workpiece;

information on a roughly-machining shape to be removed from the workpiece by the electromagnetic-wave-machining means; and a stereoscopic model of an after-electromagnetic-wave-machining shape which is obtained by subtracting the roughly-machining shape from the original shape, wherein the electromagnetic-wave-machining data is created on the basis of information on a plurality of sliced portions which are obtained by partially cutting from the stereoscopic model of the after-electromagnetic-wave-machining shape such that the stereoscopic model is sliced.

In a preferred embodiment, the electromagnetic-wave-machining data is data in which an extraction of the machining portion is performed by determining whether or not a roughly-machining region of each of the sliced portions has a penetration form penetrating through the each of the sliced portions. For example, the electromagnetic-wave-machining data may be data in which, when the roughly-machining region has the penetration form penetrating through the each of the sliced portions, data on the each of the sliced portions is combined with another data on an adjacent one of the sliced portions to create the electromagnetic-wave-machining data on a batch machining serving as a primary rough machining of the electromagnetic-wave machining. While on the other hand, the electromagnetic-wave-machining data may be data in which, when the roughly-machining region of the each of the sliced portions does not have the penetration form penetrating through the each of the sliced portions, data on the each of the sliced portions is provided with a condition of a finish machining to create the electromagnetic-wave-machining data, the finish machining serving as a secondary rough machining of the electromagnetic-wave machining.

Effect of Invention

With respect to an advantageous effect of the hybrid ultraprecision machining device for which the created machining means is used, there can be obtained a micro product with a fine structure in a short time with high accuracy even when such product can be manufactured from the difficult-to-cut materials such as ultrahard material and hardened steel.

Specifically, the hybrid ultraprecision machining device involves a rough machining of workpiece by non-contact electromagnetic wave machining as a primary process (in which most of parts to be machined are removed by such rough machining), and subsequent precision machining of the roughly machined workpiece as a secondary process by using a replaceable cutting tool. Accordingly, the lifetime of the tool is increased, and also the machining time is significantly reduced as a whole. The hybrid ultraprecision machining device can shorten the processing time by about 50% to about 80% as compared to the case of prior art wherein the micro product with the fine structure is manufactured from the difficult-to-cut material only by using a cutting tool. The hybrid ultraprecision machining device makes it possible to not only achieve the significant reduction of the machining time by the electromagnetic wave machining serving as the rough machining, but also achieve higher accuracies of the surface roughness and shape by the precision machining using the replaceable cutting tool together with an onboard measurement. As a result, the hybrid ultraprecision machining device can appropriately achieve the miniaturization and microfabrication of the metal mold without changing the shape design of the molded product (i.e., the shape of the final product, and thus the shape of the metal mold). This leads to an achievement of the miniaturization and microfabrication of the electric and electronic devices as well as various parts to be used therein. As such, a design of a desired fine product having a small size can be realized with no interruption of a manufacturing process itself, which enables the miniaturized electric and electronic devices with high performance to be suitably designed and developed.

With respect to the machining data created by the present invention, it enables "feed amount of machining process" and "electromagnetic-wave-machining condition" to be suitably adjusted, depending on the actual machining shape (particularly, depending on the electromagnetic-wave-machining shape). The constant feed of the workpiece during the machining process, for example, is not used any longer. That is, the feed amount of the workpiece can be suitably changed, depending on the electromagnetic-wave-machining shape. This leads to a reduction in an operation number of times for the feed of the workpiece during the machining process. It should be noted that the electromagnetic-wave-machining portion corresponds to a rough-machining portion. The present invention makes it possible to perform a larger amount of feed for such rough-machining portion, resulting in a total reduction in the operation number of times for such feed. In general, in order to perform the machining feed, it is required to temporarily stop the machining process of the electromagnetic-wave-machining means, followed by changing the level of a platform for workpiece. In light of this, the reduction of the operation number of times for the feed of the workpiece, which is provided by the present invention, can shorten a time of the entire machining process.

In accordance with the machining data created by the present invention (i.e., in the hybrid ultraprecision machining device equipped with a system having a memory in which the machining data is stored), the micro-machined product can be manufactured with no need of an individual judgment, which can lead to an achievement of an effective machining process. This means that the time required for the individual judgment and operation regarding the machining process as well as the creation of the machining data can be omitted or reduced.

BRIEF DESCRIPTION OF THE DRAWINGS

FIG. 6 is a perspective view schematically showing a shaper tool/shaper machining.

FIG. 7 is a perspective view schematically showing a fly-cut tool/fly-cut machining.

FIG. 8 is a perspective view schematically showing a diamond-turning tool/diamond-turning machining.

FIG. 9 is a perspective view schematically showing a micro-milling tool/micro-milling machining.

FIGS. 10(a)-(d) is a perspective view schematically showing a vibration cutting.

FIG. 17 is a perspective view schematically showing an embodiment wherein an orientation of the laser irradiation and/or a workpiece are/is adjusted according to a divergence angle or collection angle of laser, and thereby a vertical surface of the workpiece is machined.

FIG. 18 is a perspective view schematically showing an embodiment wherein "rough machining performed by electromagnetic-wave machining" and "precision machining" are concurrently performed.

FIGS. 20A, 20B and 20C are views showing the concepts of information and stereoscopic model used in the present invention wherein FIG. 20A illustrates the concept of information on an original shape corresponding to a shape of the workpiece, FIG. 20B illustrates the concept of information on a roughly-machining shape to be removed from the workpiece by the electromagnetic-wave-machining means, and FIG. 20C illustrates a stereoscopic model of an after-electromagnetic-wave-machining shape which is obtained by subtracting the roughly-machining shape from the original shape.

FIGS. 25A and 25B are views schematically shows an embodiment of an actual feed during a machining process, wherein FIG. 25A illustrates the embodiment for the present invention, and FIG. 25B illustrates the embodiment for the prior art.

FIG. 27 is a perspective view schematically showing a grinding tool/grinding machining.

FIGS. 28A and 28B are the results regarding metal molds manufactured in "EXAMPLES" wherein FIG. 28A shows case "A", and FIG. 29B shows case "B".

FIG. 29 shows an overview of "Confirmatory Test for Significance ofCreating Method of Machining Data"

FIG. 30 shows the result of "Confirmatory Test for Significance of Creating Method of Machining Data"

MODES FOR CARRYING OUT THE INVENTION

Figure 1:
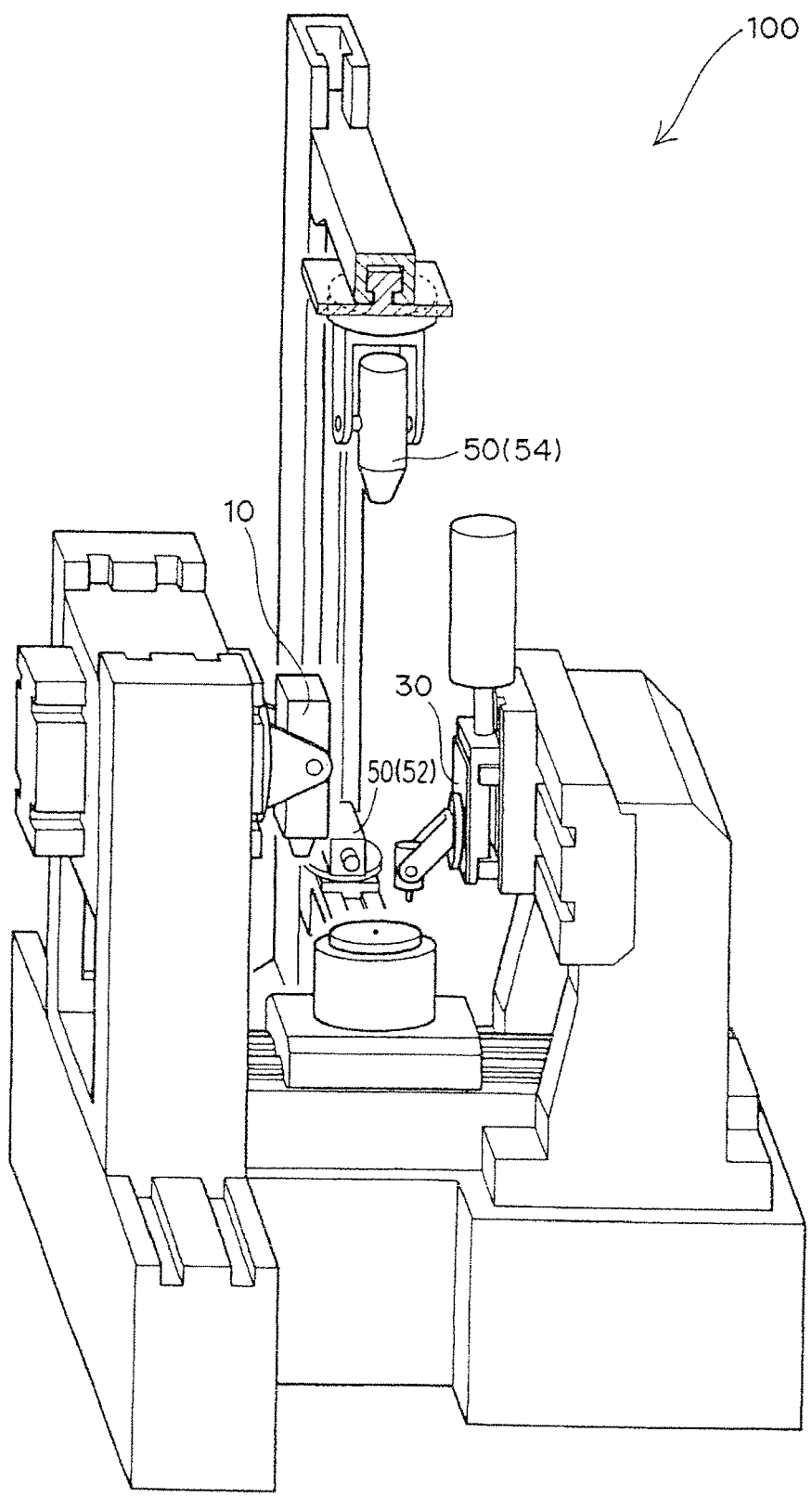
FIG. 1 is a perspective view schematically showing a constitution of a hybrid ultraprecision machining device.

With reference to the accompanying drawings, the present invention will be described in detail.

First, a basic structure of a hybrid ultraprecision machining device, which forms the basis of the present invention will be described. It should be noted that various components or elements are shown schematically in the drawings with dimensional proportions and appearances being necessarily real since they are merely for the purpose of making it easy to understand the present invention.

The hybrid ultraprecision machining device is a device for manufacturing a micro-machined product from a workpiece. As schematically shown in FIG. 1, the hybrid ultraprecision machining device 100 comprises:

an electromagnetic-wave-machining means 10 for roughly machining the workpiece;

a precision-machining means 30 for precisely machining the roughly machined workpiece; and a shape-measurement means 50 for measuring a shape of the workpiece upon use of the electromagnetic-wave machining means 10 and the precision-machining means 30.

Figure 2:
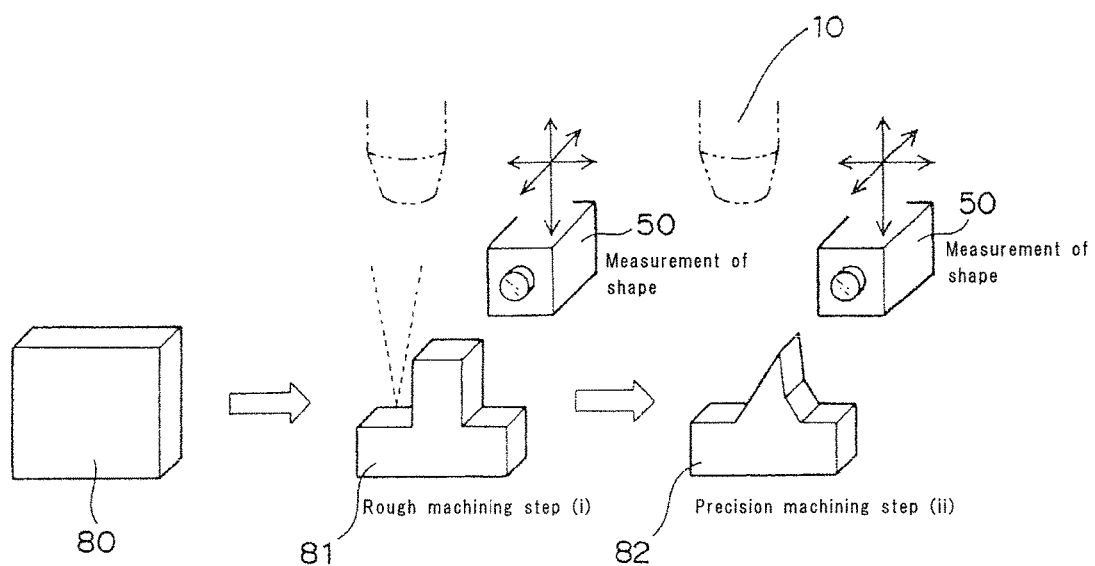
FIG. 2 is a schematic view for explaining characterizing features of a hybrid ultraprecision machining.

The hybrid ultraprecision machining device is characterized by being equipped with the electromagnetic-wave-machining means 10 serving to perform a rough machining, the precision-machining means 30 serving to a precision machining of the roughly workpiece by means of the cutting tool suitable for a micro machining (especially suitable for the micro machining of the roughly machined workpiece), and the shape-measurement means 50 serving to measure the shape of the workpiece upon the above machinings. See FIG. 2 as well as FIG. 1.

Figure 3:
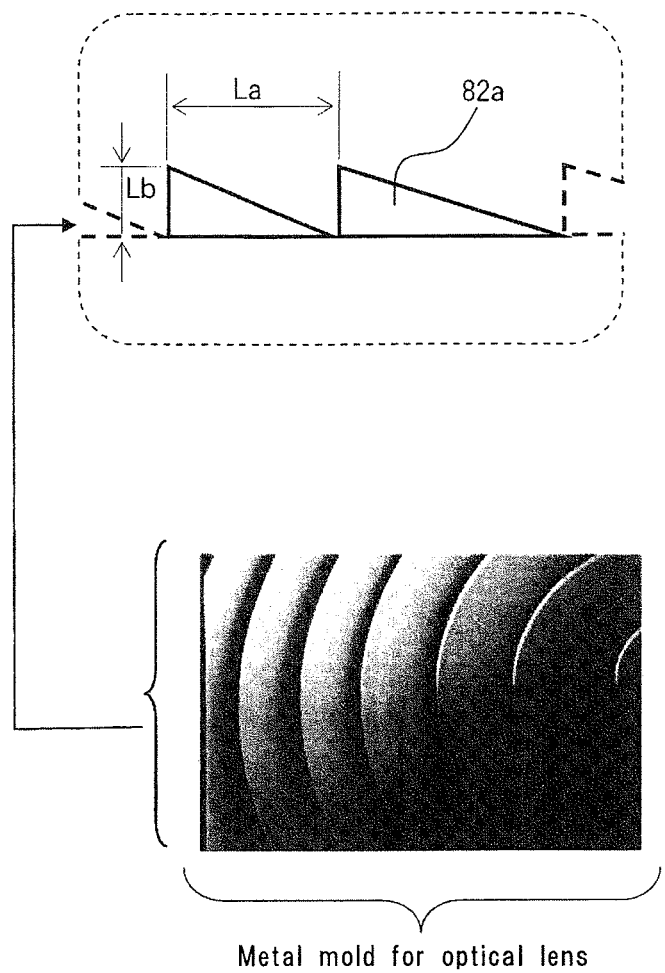
FIG. 3 shows a schematic diagram and an electron micrograph for explaining the size of a micro part of a micro-machined product.

The term "hybrid ultraprecision machining" as used in the present specification is intended for such an embodiment that the micro product with the fine structure is manufactured by a combination of "electromagnetic wave" and "precision machine", the dimension "La" or "Lb" (see FIG. 3) of the micro part of the product being in the range of several tens of nm to several mm, that is, in the range of about 10 nm to about 15 mm or about 10 nm to about 3 mm, more specifically in the range of several tens of nm to several tens of μm such as 10 nm to 500 μm and about 50 nm to 1 μm, or about 1 nm to about 1 μm in some cases. Thus, the term "ultraprecision machining" as used herein substantially means such an embodiment that an accurate machining of the workpiece is performed such that the machined workpiece has the micro part dimension "La" or "Lb" of several tens of nm to several mm as described above. In particular, the term "hybrid" as used herein substantially means a combination of two types of machinings, namely, "electromagnetic-wave machining" and "precision-machining".

As such, the hybrid ultraprecision machining device is particularly appropriate for the manufacturing of the micro product with the fine structure having the dimension of several tens of nm to several mm, that is, in the range of about 10 nm to about 15 mm, or about 10 nm to about 3 mm (for example in the range of several tens of nm to several tens of μm such as 10 nm to 500 μm and 50 nm to 1 μm, or in some cases 1 nm to 1 μm). The micro product with the fine structure to be manufactured may have a complicated multi-surface shape or curved-surface shape. Examples of the micro product with the fine structure (that is, the product that can be manufactured by the hybrid ultraprecision machining device) may include a metal mold for optical lens (for example, a metal mold for micro-lens array), and a metal mold for glass lens, a metal mold for precision-injection molding, a metal mold for precision-metal machining) in a case where the workpiece is made of ultrahard materials (cemented carbide), or metal materials such as hardened steel (quenched steel), non-iron (e.g., Bs, Cu, and/or Al) and preharden steel. Furthermore, the hybrid ultraprecision machining device makes it possible to directly manufacture the products which are generally obtained by the above metal molds. For example, an optical lens (e.g., micro-lens array), a water-repellent plate, a mirror and a precision part can be manufactured, in which case the workpiece may be made of plastic material, metal material (e.g., aluminum steel), silicon material, glass material, mineral material, or polycrystalline diamond material. As such, the hybrid ultraprecision machining device does not limit the materials of the workpiece, and can perform a hybrid ultraprecision machining on the workpiece of inorganic materials (e.g., glass material and/or metal material), or on the workpiece of organic materials (e.g., polymer material).

The electromagnetic-wave-machining means 10 of the hybrid ultraprecision machining device 100 is used for roughly machining the workpiece. The term "roughly machining" as used herein means that a workpiece body to be removed is roughly removed. Specifically, the term "roughly machining" used in the present invention substantially means that a ratio of the body part to be removed from the workpiece to the whole thereof is in the range of 70 to 95 volume %, preferably in the range of 80 to 95 volume %, and more preferably in the range of 90 to 95 volume %.

The electromagnetic-wave-machining means serves to generate a wave or light having a frequency of 10 kHz to 500 kHz so that the part of the workpiece body is removed due to the heating action. It is preferred that the electromagnetic-wave-machining means is a laser machining means. In this regard, the hybrid ultraprecision machining device 100 is preferably equipped with a laser generator capable of irradiating the workpiece with a laser light. In a case where the electromagnetic-wave-machining means 10 is the laser machining means, it is preferred that the type of the laser is a solid-state laser, a fiber laser, a gas laser, or the like.

Figure 4:
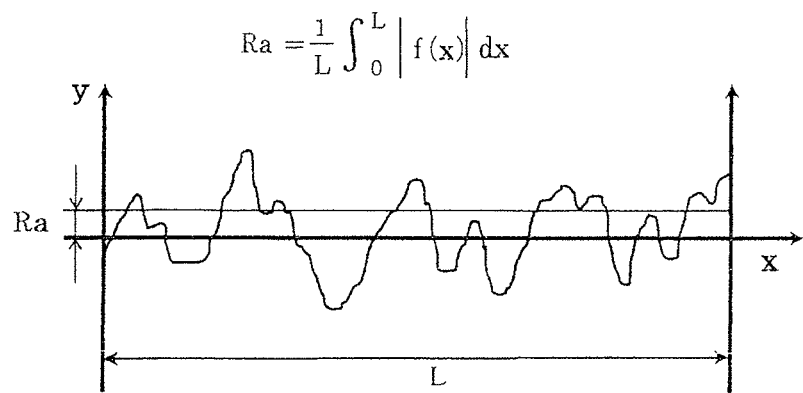
FIG. 4 is a diagram schematically showing the concept of arithmetic mean roughness (Ra).

The precision-machining means 30 of the hybrid ultraprecision machining device 100 is used for precisely machining the roughly machined workpiece. The term "precision machining" as used herein substantially means that the roughly machined workpiece is subjected to a cutting process under the cutting order of nm (for example, about 10 nm to 5000 nm, or about 50 nm to 1000 nm) so that the desired micro product with the fine structure is provided. It is particularly preferred that the "precision machining" produces the micro product with the fine structure having a surface roughness Ra of several nm to several hundreds of nm (for example, surface roughness Ra of about 2 nm to about 200 nm). The term "surface roughness Ra" as used herein corresponds to an arithmetic mean roughness. Thus, the surface roughness Ra substantially means a mean value calculated from the sum of absolute values of the deviations from the average line over the length L of an evaluation section that is set in the roughness curve as shown in FIG. 4 ("roughness curve" in this case corresponds to a section profile of the surface of the micro product with the fine structure). From another point of view regarding the surface roughness, the micro product with the fine structure can have a surface roughness Rz of 100 nm or less (that is, Rz=0 to 100 nm).

Figure 5:
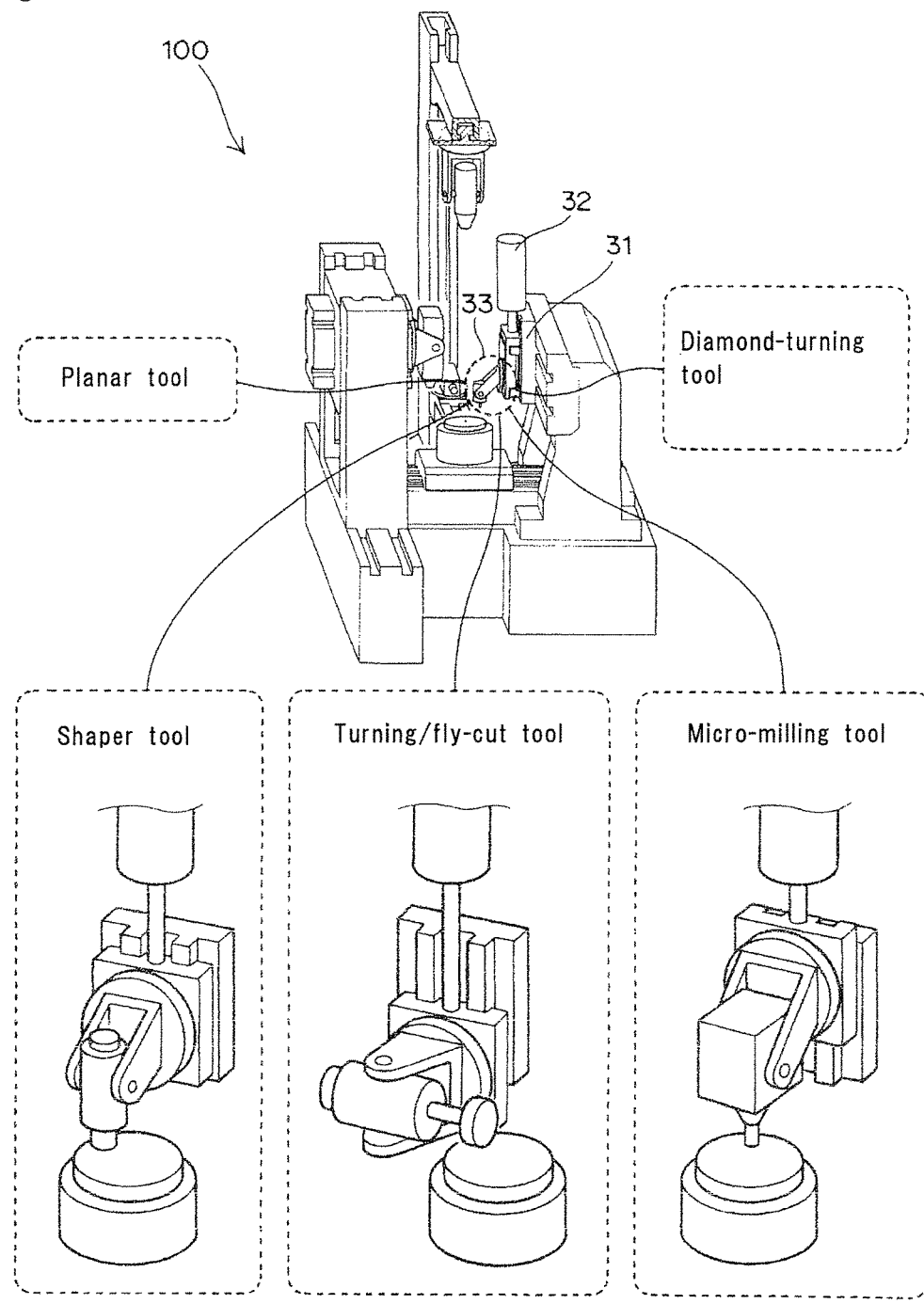
FIG. 5 is a perspective view schematically showing a precision-machining means/precision-machining process.

The precision-machining means 30 is equipped with The replaceable cutting tool selected from a croup consisting of a planar tool, a shaper tool, a fly-cut tool, a diamond-turning tool and a micro-milling tool (see FIG. 5). That is, at least one cutting tool, preferably at least two cutting tool is/are provided in a replaceable state in the precision-machining means 30, and thereby at least one cutting process, preferably at least two cutting processes selected from a group consisting of a planar machining, a shaper machining, a fly-cut machining, a diamond-turning machining and a micro-milling machining is/are performed.

It is particularly preferred that at least one cutting tool selected from the group consisting of the shaper tool, the fly-cut tool, the diamond-turning tool and the micro-milling tool is replaceable in the precision-machining means.

As shown in FIG. 5, the precision-machining means 30 comprises a sliding platform 31 which has a function of a sliding movement in a horizontal direction, a motor for vertical-axis movement 32, and a machining head 33. The planar tool, the shaper tool, the fly-cut tool, the diamond-turning tool and/or the micro-milling tool may be replaceably disposed on the machining head 33. With respect to a replaceable mechanism of the precision-machining means, the cutting tool may be installed on the machining head, a feed mechanism, a table, or a main shaft by a screwing or fitting means. Alternatively, the cutting tool which has been in advance installed on the machining head or the like may be provided in such a movable state that the cutting tool is selectively used to perform the precision-machining of the workpiece.

Now, the cutting tools of the precision-machining means 30 will be described in detail.

Planar tool: This is a cutting tool for performing a so-called "planar machining (planing)". That is, the planar tool is a cutting tool for cutting the workpiece to produce a plane surface thereof. Typically, a byte tool is used as the planar tool. While a table with the workpiece mounted thereon is being moved horizontally, the byte tool is intermittently fed in the direction perpendicular to the movement direction of the table. As such, the planing process by the planar tool can be performed.

Shaper tool: This is a cutting tool for performing a so-called "shaper machining (shaping)". That is, a shaper tool 34 is a cutting tool for cutting the workpiece to mainly produce a non-planar surface, for example to produce a groove (see FIG. 6). Typically, a byte tool is used as the shaper tool. While a table with the workpiece mounted thereon is intermittently fed in the direction perpendicular to the movement direction of the byte tool, the reciprocating byte is brought into contact with the workpiece. As such, the shaping process by the shaper tool can be performed.

Fly-cut tool: This is a cutting tool for performing a so-called "fly-cut machining". Typically, a rotation tool is used as the fly-cut tool 35. While a rotation tool is being rotated, the rotation tool is fed to the workpiece (specifically, the workpiece with its position fixed) to cut the workpiece (see FIG. 7). The term "fly-cut" substantially means the same as the term "fly machining". However, the fly-cut may include such a machining mode that only one blade is used in the precision machining according to an embodiment of the present invention.

Diamond turning tool: This is a cutting tool for performing a so-called "single point diamond turning (SPDT)" or "ultraprecision turning machining". Typically, while the workpiece 81 is being rotated, a diamond tool 36 is brought into contact with the workpiece 81, and thereby the workpiece is machined so that it has the shape with its center positioned at the center of rotation (see FIG. 8).

Micro milling tool: This is a cutting tool for performing a milling, for example "micro-milling". Typically, a rotation tool with a small diameter (for example, a diamond rotation tool) is used as the micro milling tool 37. While the rotation tool is being rotated, the rotation tool is brought into contact with the workpiece to reflect the shape of the tip edge of the tool blade in the workpiece or to form various shapes (see FIG. 9).

In the hybrid ultraprecision machining device 100, the precision-machining means 30 has an additional function of vibration cutting. That is, the above-mentioned cutting tool can be subjected to a vibration. For example, the cutting tool is attached to a driving piezoelectric element. The vibration cutting can provide the effects of "decreasing a cutting resistance", "preventing an adherence phenomenon in the tip edge of the tool blade" and "suppressing a distortion attributed to thermal action". The vibration cutting is preferably performed in a form of "ultrasonic wave elliptical vibration cutting". Specifically, the tip edge of the cutting tool is vibrated elliptically (see FIG. 10). The vibration cutting can effectively achieve a large reduction in the cutting resistance, the suppression of the generation of burr and chatter vibration, and a reduction in thickness of the chip.

The hybrid ultraprecision machining device 100 comprises the shape-measurement means 50. The shape-measurement means 50 is used for an onboard measuring of the shape of the workpiece upon the use of the electromagneticwave-machining means 10 and the precision-machining means 30. The term "shape measurement" substantially means that the shape and/or position of the workpiece are/is measured at a point in time at least one of before, during and after the machining process.

Examples of the shape-measurement means may include "imaging means", "a detector using a laser light", and the like. The imaging means may be a CCD camera, an infrared camera, a near-infrared camera, a mid-infrared camera, or a X-ray camera, for example. The "detector using the laser light" may be a laser microscope, or a laser interferometer, for example. Alternatively, a white light interferometry is possible for performing the measurement of the shape. Furthermore, the "contact-measurement means" may be preferably used. For example, the shape-measurement means may be a measurement device using a probe (three-dimensional indicator). In this regard, scanning probe microscopes such as a scanning tunneling microscope and an atomic force microscope may be used, for example.

Figure 11A:
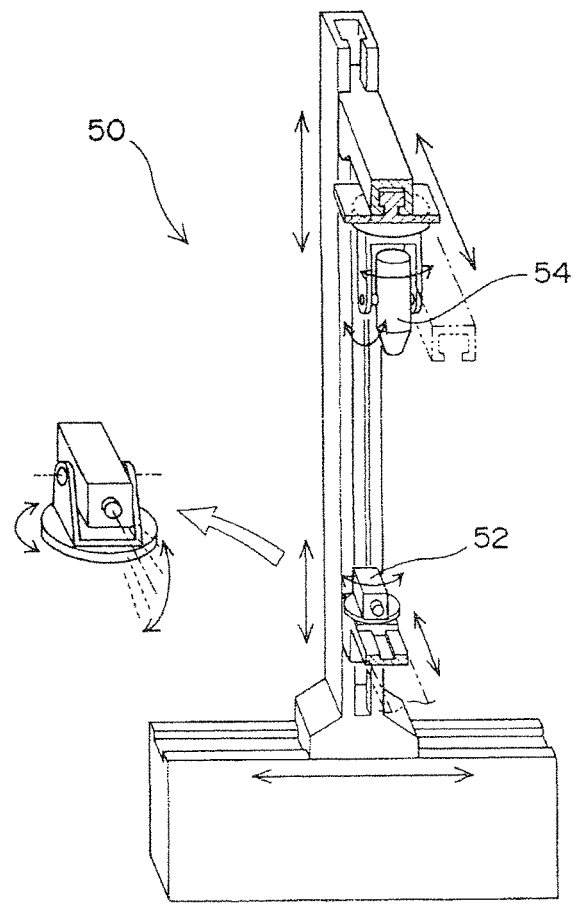
FIG. 11A is a perspective view schematically showing a shape-measurement means.

As shown in FIG. 11A and FIG. 1, the shape-measurement means 50 preferably includes a combination of "imaging means 52" and "detector 54 using the laser light". In this case, it is preferred that the position of the workpiece is identified by the "imaging means 52", and then the shape of the workpiece (especially, the shape of a part to be machined) is identified by the "detector 54 using the laser light".

Figure 11B:
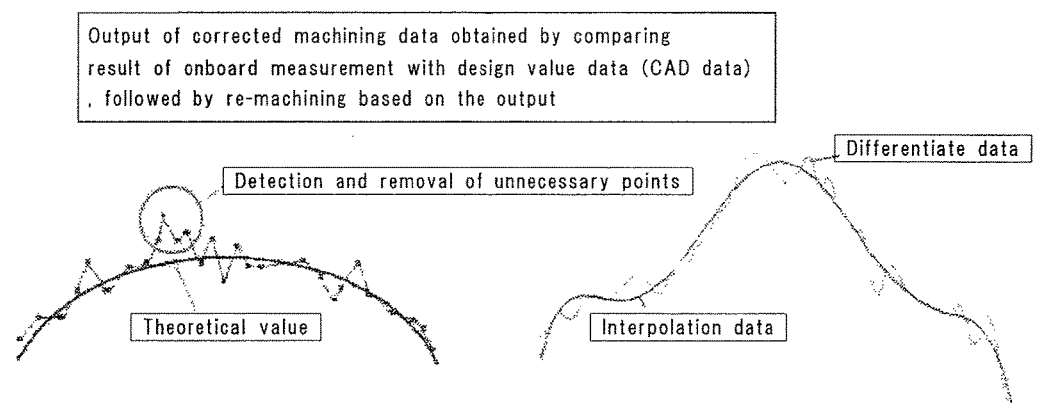
FIG. 11B is a perspective view schematically showing a creation of data for a correction machining.

Information on the shape and/or position of the workpiece measured by the shape measurement means 50 is fed back to the electromagnetic-wave-machining means 10 and the precision-machining means 30 to be used for the desired electromagnetic-wave machining and/or precision machining. Accordingly, the hybrid ultraprecision machining device comprises a control means (e.g., "computing means" to be described below) for controlling the electromagnetic-wave-machining means or the precision-machining means, based on the information on the shape of the workpiece, the shape being measured by the shape-measuring means. By way of example, upon performing the electromagnetic-wave machining and/or precision machining, the shape and/or position of the workpiece are/is measured by the shape-measurement means 50 in real time, and the measured data is utilized by the machining means. For example, data for a correction machining is created, based on "data measured by the shape-measurement means" and "data on a machining path of the electromagnetic-wave-machining means and/or the precision-machining means, the path being obtained from a model for the micro-machined product". The electromagnetic-wave machining and/or precision machining are/is performed based on the created data for the correction machining. See FIG. 11B. The hybrid ultraprecision machining device preferably includes a computing means for creating the data for the correction machining.

Figure 12:
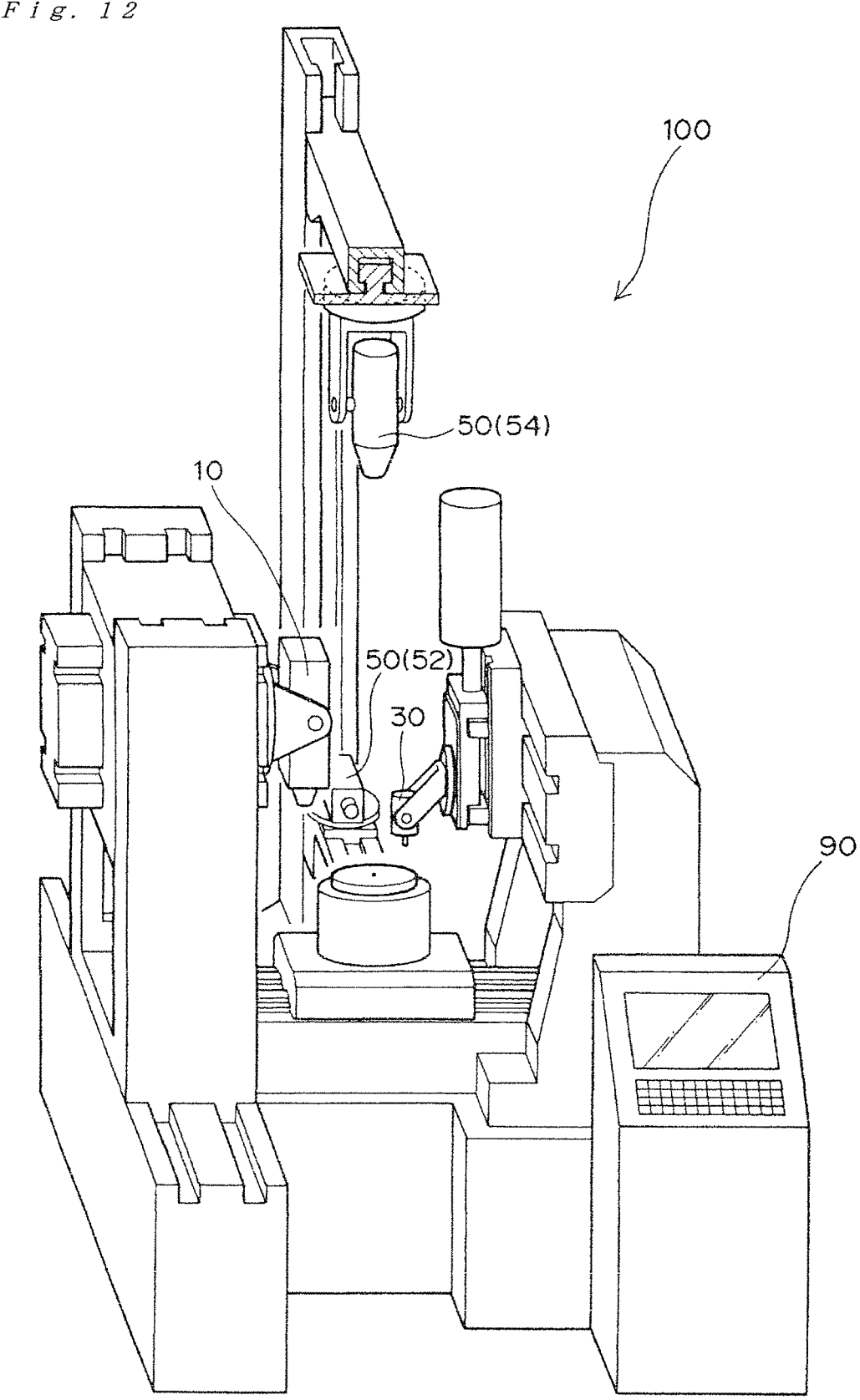
FIG. 12 is a perspective view schematically showing a computing means having a form of a computer.

The computing means may be for example in a form of a computer 90, as shown in FIG. 12. For example, it is preferred that the computer as the computing means is composed at least of a CPU, a primary storage device and a secondary storage device. The "data on a machining path of the electromagnetic-wave-machining means and/or the precision-machining means, the path being obtained from a model for the micro-machined product" stored in the storage device(s) of the computer is compared with the "data measured by the shape-measurement means". Then, a difference between these data is calculated, and thereby the data for the correction machining is provided. By way of example, during or after the machining process, the shape of the workpiece is measured to store the relationship between the workpiece material and the amount of deformation (error) as a database, whereby such database for the correction machining may be automatically created. It is preferred that the computing means can automatically create the machining path (particularly, the hybrid machining path) for the electromagnetic-wave machining means and/or precision machining means by a computation of numerical values from the model shape of the micro-machined product and the shape of the workpiece.

Figure 13A:
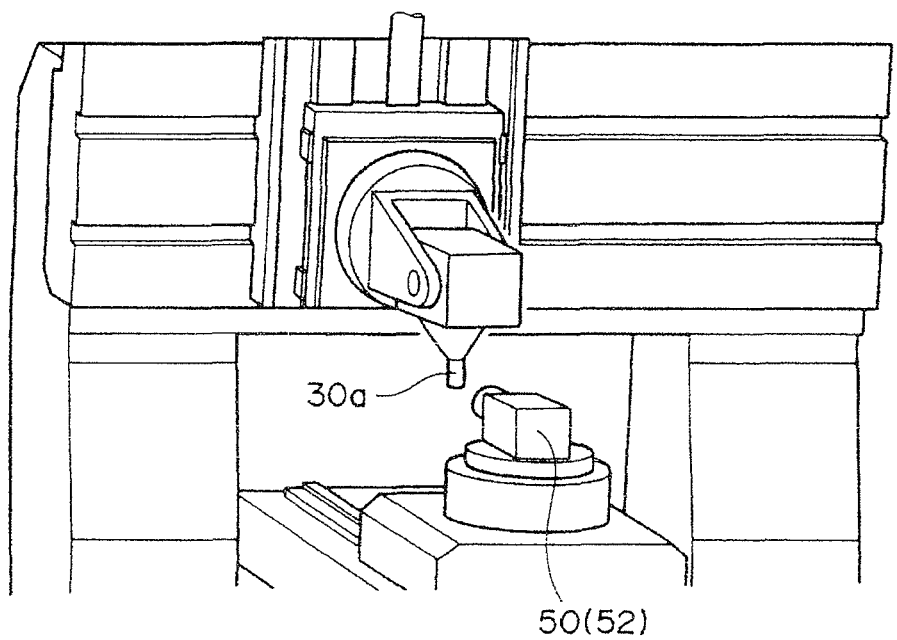
FIG. 13A is a perspective view schematically showing an embodiment wherein a shape/position of the tip of tool is measured.
Figure 13B:
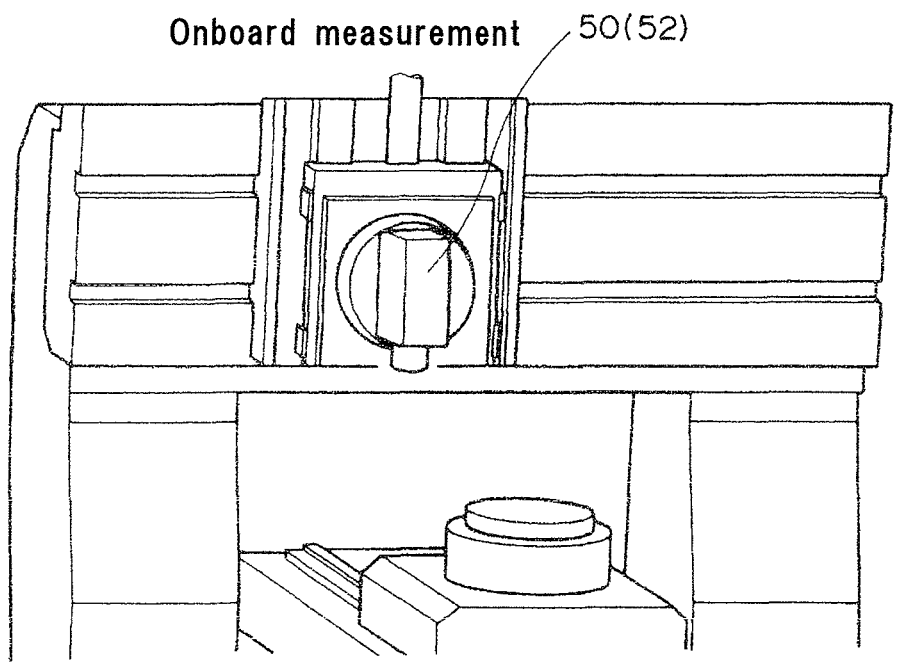
FIG. 13B is a perspective view schematically showing an embodiment wherein a shape-measurement means is provided movably in a vertical direction.

The shape-measurement means 50 may measure not only the shape and/or position of the workpiece, but also the shape and/or position of the tip 30a of the tool blade (see FIG. 13A). Even in this case, the resulting data and information are fed back to the electromagnetic-wave machining means 10 and/or the precision-machining means 30 to be used for the desired electromagnetic-wave machining and/or precision machining. For the onboard measurement, the shape measurement-means 50 may be provided movably in the vertical direction, as shown in FIG. 13B.

The hybrid ultraprecision machining device 100 can be embodied in various embodiments. Preferred embodiments of the present invention will be described below by way of example.

(Embodiment of Synchronization Control)

Figure 14:
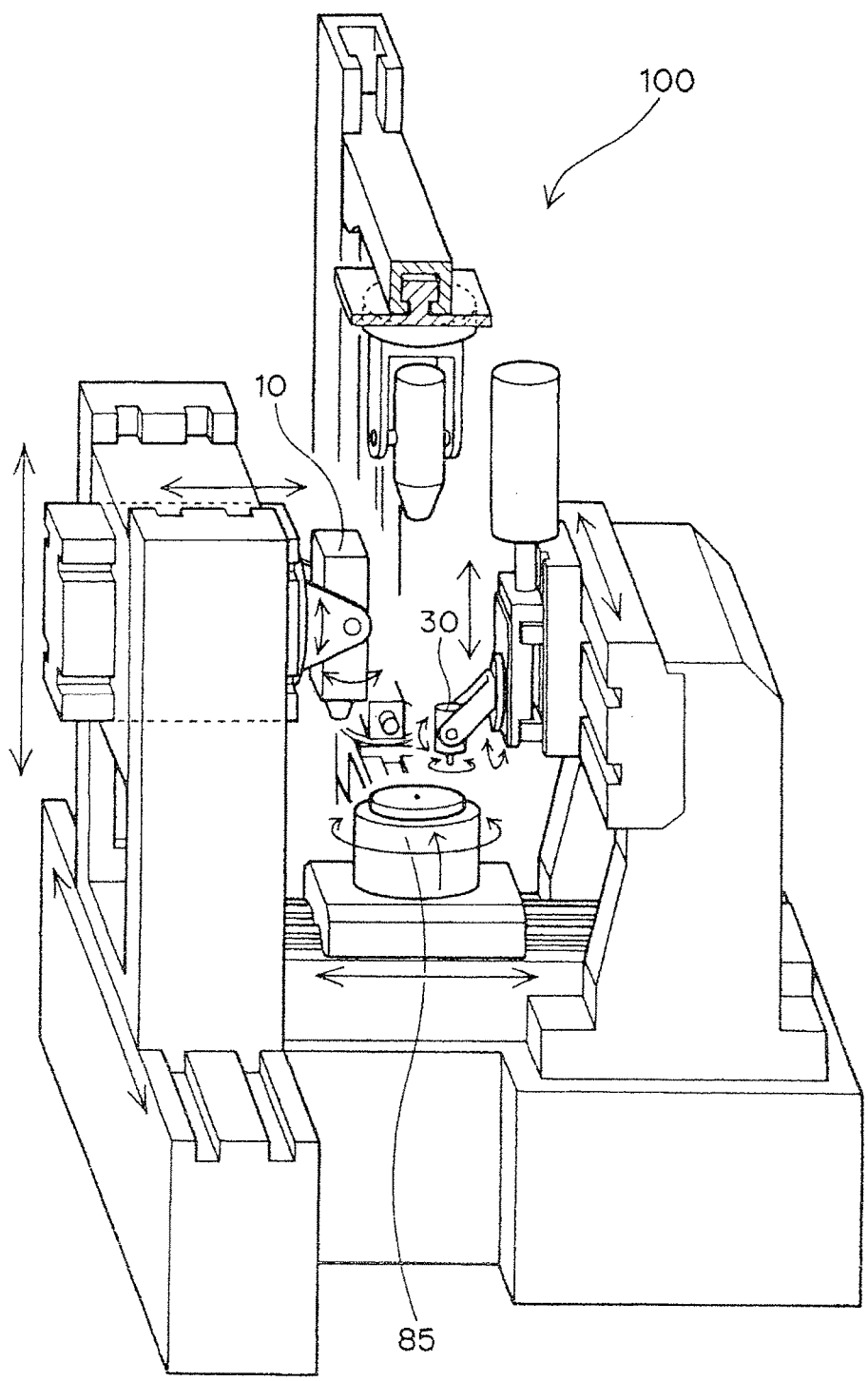
FIG. 14 is a perspective view schematically showing an embodiment wherein "operation of at least one axis of a table for mounting the workpiece" and "operation of at least one axis of a precision-machining means and/or an electromagnetic-wave-machining means" are controlled in synchronization with each other.

According to this embodiment, the hybrid ultraprecision machining device further comprises a controller for controlling an operation of at least one axis of a table for mounting the workpiece and an operation of at least one axis of a precision-machining means and/or an electromagnetic-wave-machining means in synchronization with each other. That is, as shown in FIG. 14, the controller is used for controlling the movement of the table 85 for mounting the workpiece in at least one direction, and also the movement of the precision machining means 30 and/or electromagnetic wave machining means 10 in at least one direction. Such controller may be provided in the above computing means, and thus may be for example in a form of the computer 90 (see FIG. 12). The controller of the hybrid ultraprecision machining device can furthermore shorten the machining time.

(Embodiment of Movability Regarding Laser Machining)

Figure 15:
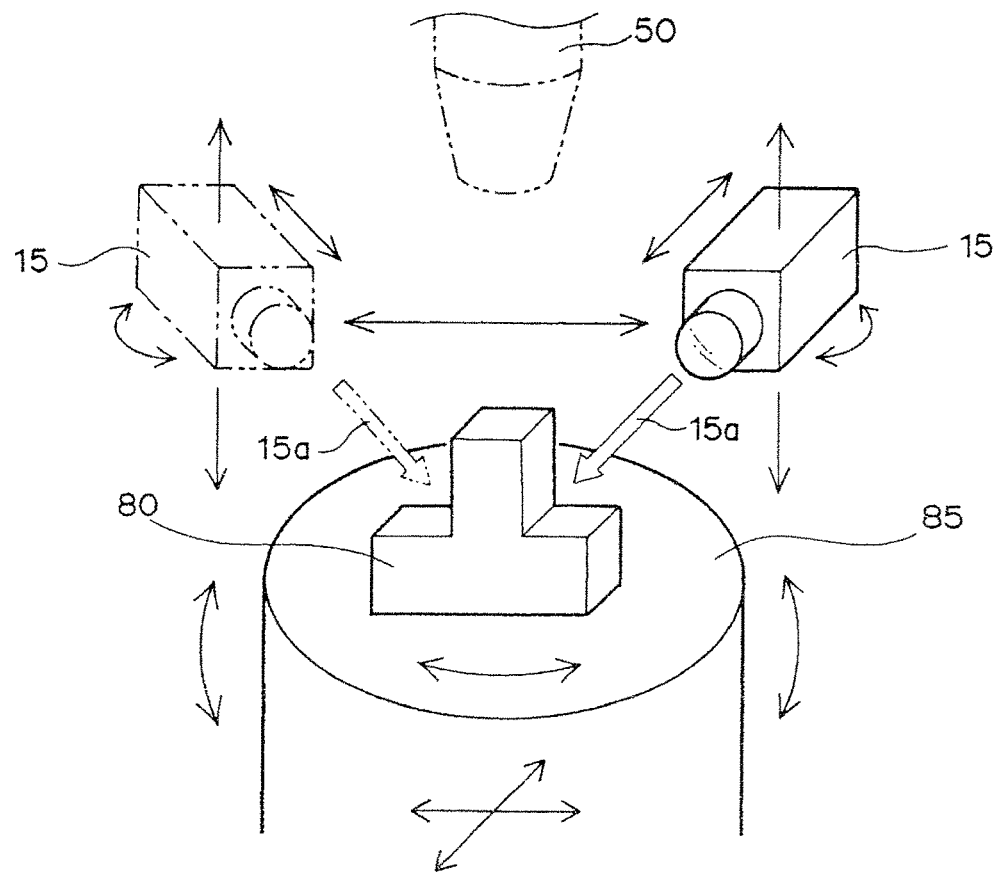
FIG. 15 is a perspective view schematically showing an embodiment wherein an angle of a laser incident light from a laser-machining means is adjustable with respect to a workpiece.
Figure 16:
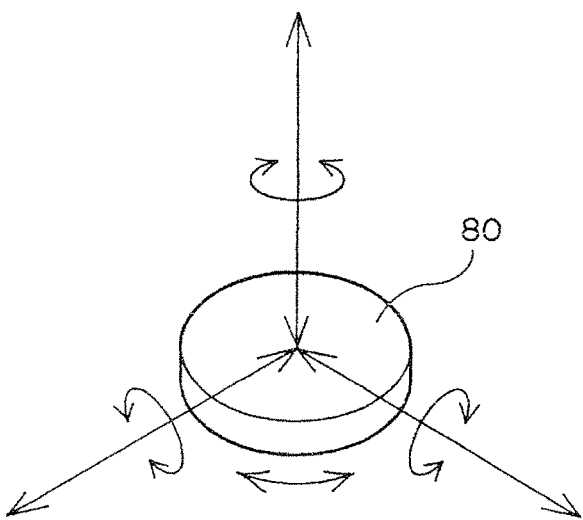
FIG. 16 is a perspective view schematically showing an embodiment wherein a workpiece is provided in a movable state along axes of a rotation direction, a horizontal direction and/or a vertical direction (e.g., workpiece in the movable state along maximum 6 axes as shown in FIG. 16).

According to this embodiment, a table 85 for mounting the workpiece 80, and/or the laser-machining means 15 are/is movable as shown in FIG. 15, and thereby an angle of a laser incident light 15a from the laser-machining means is adjustable with respect to the workpiece 80. This makes it possible to more suitably manufacture the micro-machined product with its desired shape. The movable table 85 for mounting the workpiece 80 thereon has various moving mechanisms (for example, a cam mechanism or the like) allowing the workpiece 80 to move for example in the rotation direction, horizontal direction and/or vertical direction (see FIG. 16). The table may be movable so that it is in a tilted state. Likewise, the movable laser machining means 15 preferably has various moving mechanisms allowing the laser head or the like to move in the rotation direction, horizontal direction and/or vertical direction, for example. A vertical surface 80a of the workpiece 80 (or approximately vertical surface or small-tapered surface of the workpiece) can be machined by adjusting the orientation(s) of the laser irradiation and/or the workpiece according to a divergence angle α' or collection angle α of the laser irradiation (see FIG. 17).

(Embodiment of Various Different Types of Laser in Laser Machining Means)

According to this embodiment, the laser-machining means comprises a plurality of laser generators which are capable of generating different laser wavelengths from each other. That is, the hybrid ultraprecision machining device is equipped with a plurality of laser devices thereon, and thereby an optimal wavelength from among a plurality of laser wavelengths can be selected according to the material of the workpiece. This makes it possible to increase the flexibility in material of the workpiece. For example in a case where a metal mold for micro-lens array is manufactured as the micro-machined product, it is preferred that a laser device capable of generating a laser beam with a wavelength of 500 nm to 1100 nm, and another laser device capable of generating another laser beam with a wavelength of 200 nm to 400 nm are provided. In another case where a micro-lens array is manufactured as the micro-machined product directly from the workpiece made of glass or plastic material, a laser device capable of generating a laser beam with a wavelength of 300 nm to 1100 nm and a pulse width of several tens of ps to several hundreds of fs may be provided.

"Rough machining performed by electromagnetic-wave machining" and "precision machining" may be substantially performed concurrently. That is, "rough machining performed by electromagnetic-wave machining" and "precision machining" may be concurrently performed. More specifically, as shown in FIG. 18, a part "A" of the workpiece 80 may be roughly cut by the electromagnetic wave machining, whereas another part "B" of the workpiece 80 which has been already roughly cut may be subjected to the precision machining. As shown in FIG. 18, the workpiece may be subjected to both of the rough machining and theprecision machining at the same time by implementing a rotation of the mounting table 85, for example.

[Creating Method of Machining Data According to Present Invention]

Figure 19:
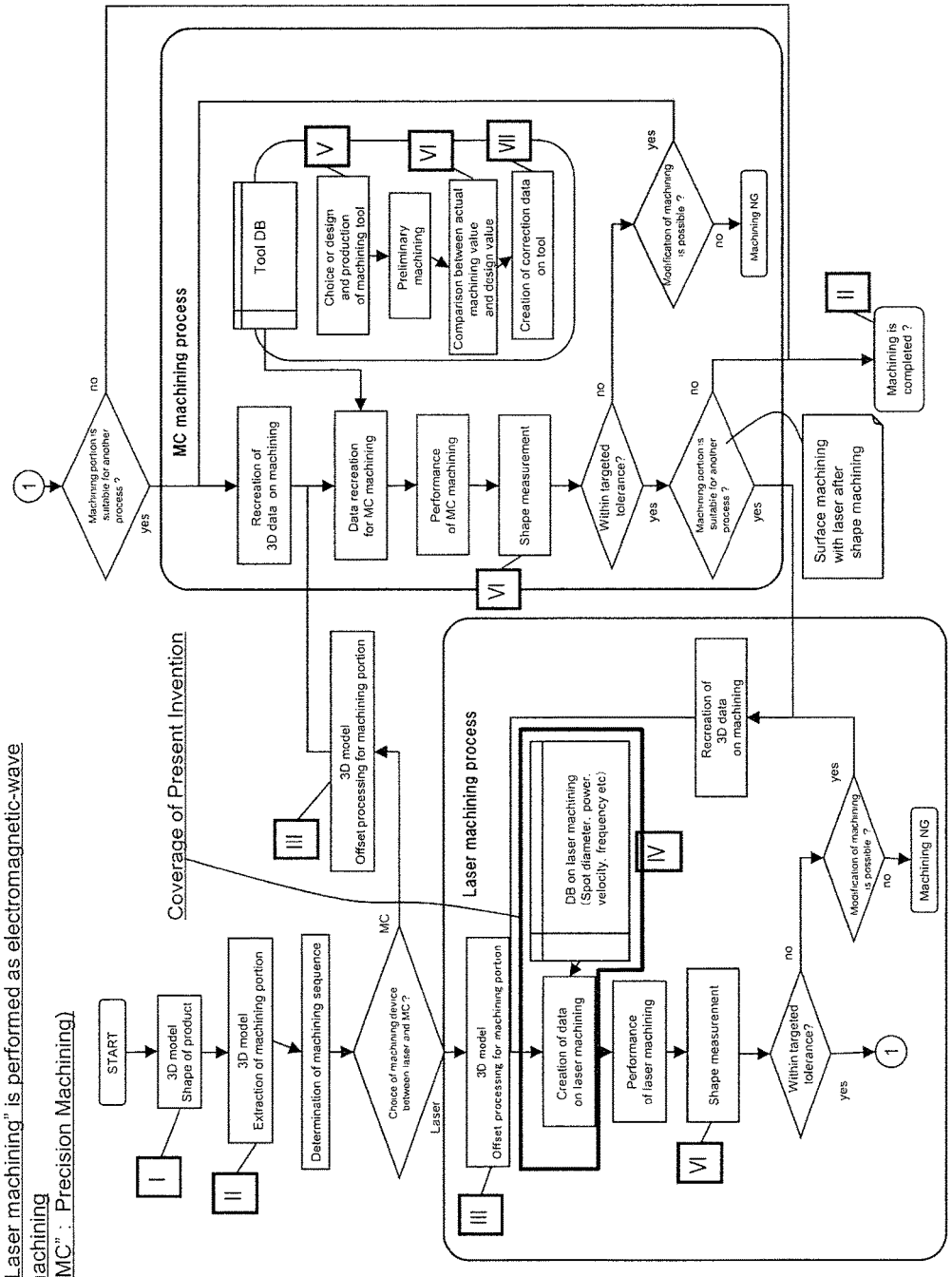
FIG. 19 is a flowchart showing a coverage of the present invention.

The present invention relates to a creating method of machining data, the method being suitable for the above hybrid ultraprecision machining device. In particular, the present invention relates to the creating method of the machining data for the electromagnetic-wave machining in accordance with a targeted product. The coverage of the present invention is shown in FIG. 19. As seen from FIG. 19, the creating method of the machining data according to the present invention is performed at a point in time before the manufacturing of the micro-machined product.

Specifically, the machining data for the electromagnetic-wave machining according to the method of the present invention is created by making use of the followings:

information on an original shape corresponding to a shape of a workpiece;

information on a roughly-machining shape to be removed from the workpiece by the electromagnetic-wave-machining means; and a stereoscopic model of an after-electromagnetic-wave-machining shape which is obtained by subtracting the roughly-machining shape from the original shape.

Figure 20A:
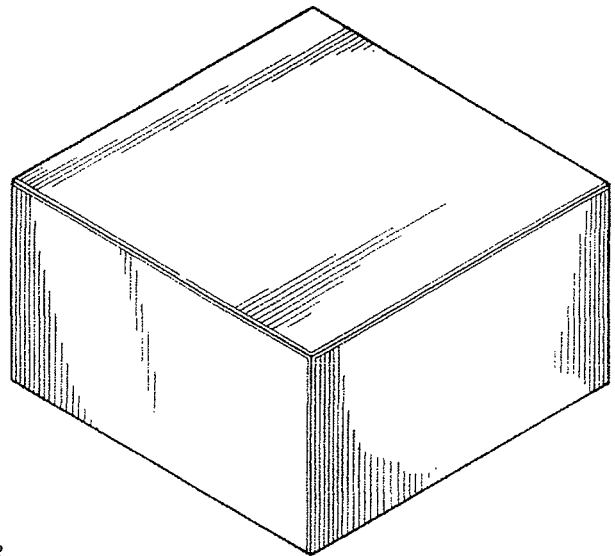

"Information on the original shape corresponding to the shape of the workpiece" is information on a shape of the workpiece at a point in time before the machining process is performed, as shown in FIG. 20A. In other words, it is information on an original shape of the workpiece to be subjected to a machining process of the hybrid ultraprecision machining device.

Figure 20B:
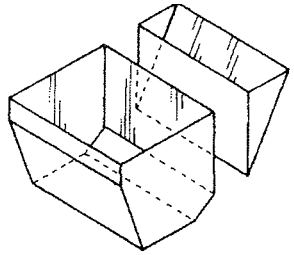

"Information on the roughly-machining shape to be removed from the workpiece by the electromagnetic-wave-machining means" is information on a removed portion to be removed by a rough machining of the electromagnetic-wave machining, as shown in FIG. 20B. In other words, it is information on a shape of a part of the workpiece, the part being to be finally removed by the electromagnetic-wave-machining means.

Figure 20C:
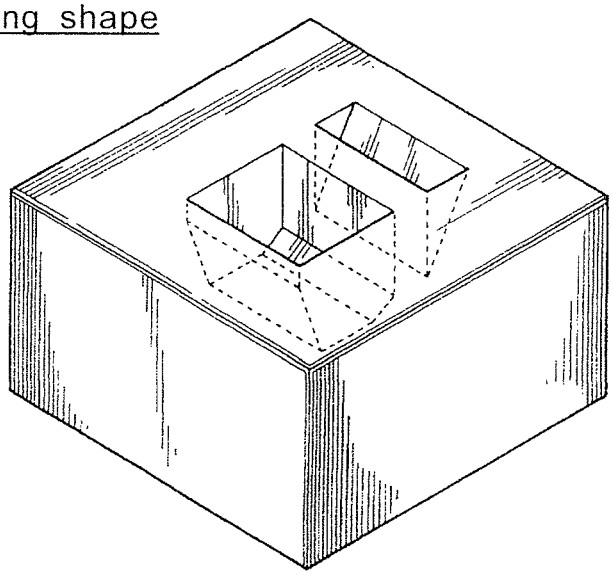

"Stereoscopic model of the after-electromagnetic-wave-machining shape which is obtained by subtracting the roughly-machining shape from the original shape" is a stereoscopic model as shown in FIG. 20C wherein the removed portion by the electromagnetic-wave machining as shown in FIG. 20B is applied to the workpiece as shown in FIG. 20A. In other words, it is a three-dimensional model of the machined workpiece, a part of which has been removed by the electromagnetic-wave-machining means.

Figure 21A:
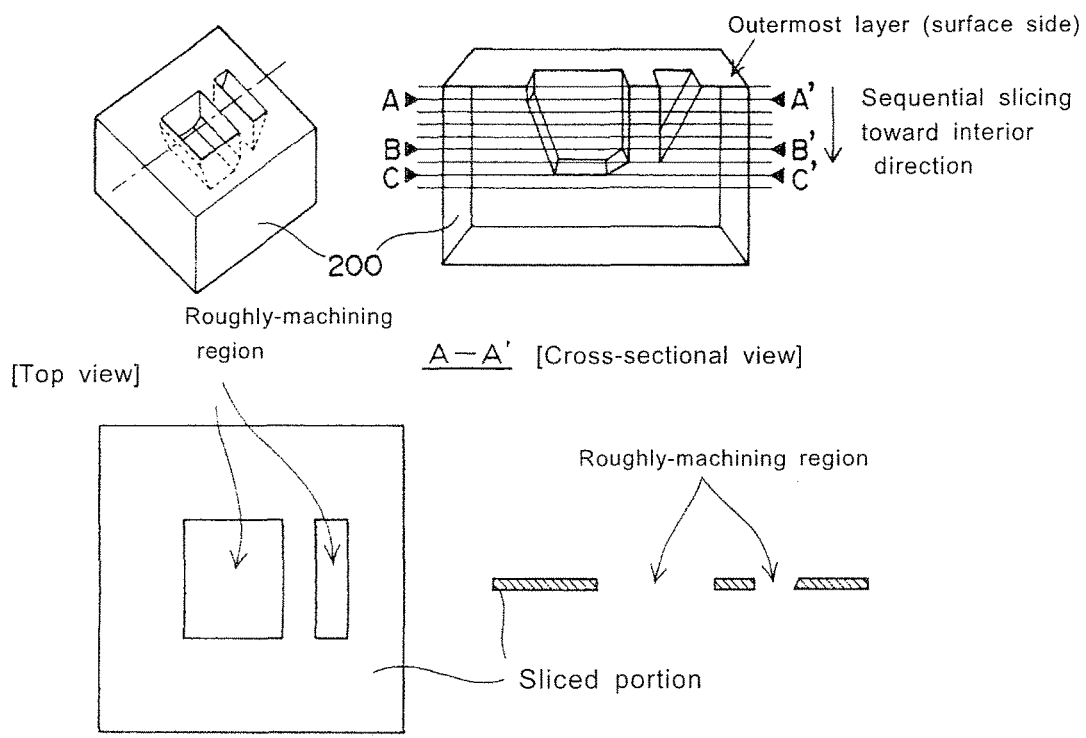
FIGS. 21A, 21B and 21C are views showing the concept of information on a plurality of sliced portions obtained by cutting from the stereoscopic model of an after-electromagnetic-wave-machining shape such that the stereoscopic model is sliced.
Figure 21B:
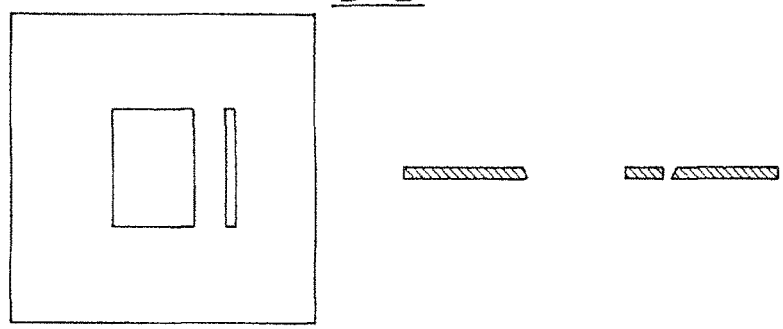
Figure 21C:
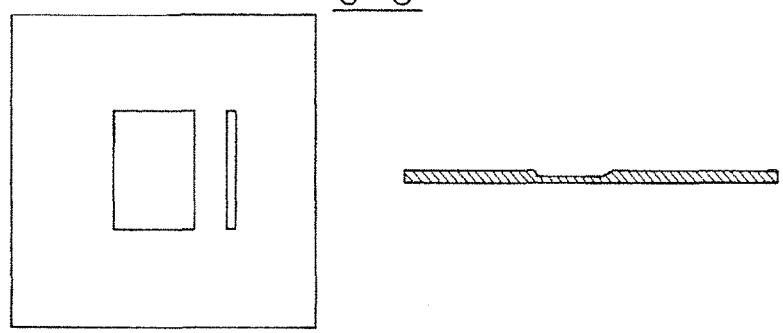
Figure 22:
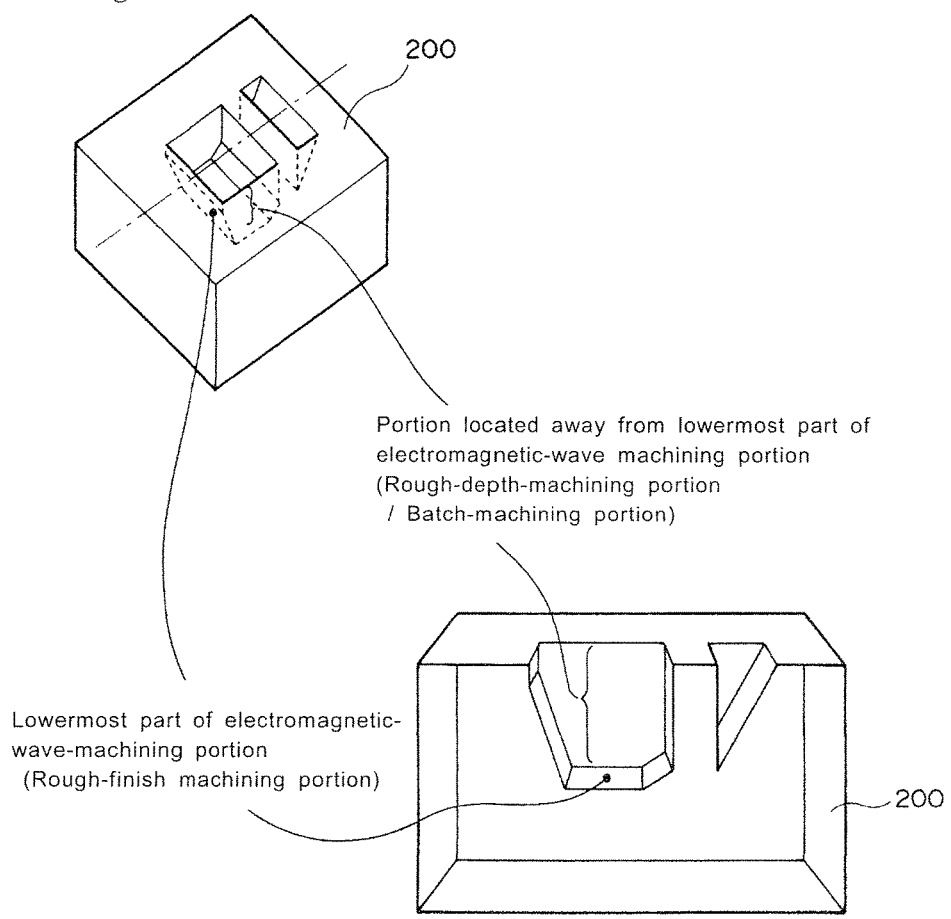
FIG. 22 is views showing the concept of "portion of electromagnetic-wavemachining, away from a lowermost part thereof which is suitable for the batch machining, i.e., a rough-depth machining" and "lowermost part of the electromagnetic-wave machining portion, which is suitable for a rough-finish machining performed for the subsequent precision machining".

In the method of the present invention, an electromagnetic-wave-machining data is created on the basis of information on a plurality of sliced portions which are obtained by partially cutting from the stereoscopic model of the after-electromagnetic-wave-machining shape such that the stereoscopic model is sliced. As shown in FIG. 21, the plurality of sliced portions are obtained by partially cutting from the stereoscopic model 200 such that the stereoscopic model 200 is sequentially sliced in the direction from the surface thereof toward the interior thereof. The sliced portions respectively have the same thickness as each other. See FIGS. 21A to 21C. The term "slice" used herein means an processing embodiment wherein a model of the after-electromagnetic-wave-machining shape is partially cut out in a direction perpendicular to the thickness direction of the model as a computer processing (particularly, as a computer processing of three-dimensional CAD).

As shown in FIGS. 21A to 21C, the sliced portion reflects a form of a roughly-machining region. Thus, a machining portion for the electromagnetic-wave-machining means can be extracted, based on the form of the roughly-machining region of the sliced portion. For example, on the basis of the form of the roughly-machining region of the sliced portion, it is determined whether such roughly-machining region is suitable for a depth machining (i.e., batch machining) serving as a primary rough machining, or it is suitable for a finish machining serving as a secondary rough machining in order to create the machining data for the electromagnetic-wave machining. In other words, it is determined whether each of the sliced portions is away from a lowermost part of the electromagnetic-wave machining portion, which is suitable for the batch machining, i.e., a rough-depth machining, or such each of the sliced portion is the lowermost part of the electromagnetic-wave machining portion, which is suitable for a rough-finish machining performed for the subsequent precision machining.

For the creation of the electromagnetic-wave-machining data, it is preferably determined whether or not the roughly-machining region of each of the sliced portions has a penetration form penetrating through the each of the sliced portions. More specifically, for example as shown in FIGS. 21A and 21B, when the roughly-machining region of the each of the sliced portions has the penetration form penetrating through the each of the sliced portions, then data on the each of the sliced portions is combined with another data on an adjacent one of the sliced portions to create/recreate the machining data on the batch machining serving as the primary rough machining of the electromagnetic-wave machining, the adjacent one being a preceding or subsequent sliced portion adjacent to the each of the sliced portions. In this creation/recreation of the electromagnetic-wave-machining data, it is preferable to refer the data on the each of the sliced portions to a preliminarily-prepared database. The example for this will be explained as follows. If there is prepared a database that a machinable depth "A" is 4Δd in consideration of the electromagnetic-wave machining conditions where the sliced portion has the thickness of Δd according to such database, the electromagnetic-wave machining is capable of removing a part of the workpiece, the part corresponding to a depth dimension of "4Δd"), the thickness of the sliced portion(s) and the machinable depth "A" are compared with each other. Specifically, the thickness Δd for one sliced portion $X_1$ is smaller than the machinable depth "A", and thus such thickness is regarded as being electromagnetic-wave machinable. The next sliced portion $X_2$ (thicknessΔd) is taken into account, while the sliced portion $X_1$ is made pending. Specifically, the total thickness 2Δd of the sliced portions $X_1$ and $X_2$ is compared with the machinable depth "A". This total thickness 2Δd is also smaller than the machinable depth "A", and thus is regarded as being electromagnetic-wave machinable. While the sliced portion $X_2$ is also made pending, the another next sliced portion $X_3$ (thicknessΔd) is then taken into account. Similarly, the total thickness 3Δd of the sliced portions $X_1$ to $X_3$ is compared with the machinable depth "A". These comparisons are sequentially repeated until the total thickness of the sliced portions becomes larger than the machinable depth "A", and thereby one data for the rough-depth machining is finally created.

While on the other hand, as shown in FIG. 21C, when the roughly-machining region of the each of the sliced portions does not have the penetration form penetrating through the each of the sliced portions, then data on the each of the sliced portions is provided with a condition of a finish machining so as to create the machining data, the finish machining serving as the secondary rough machining of the electromagnetic-wave machining. When the roughly-machining region of the each of the sliced portions does not have the penetration form penetrating through the each of the sliced portions, such region can correspond to the lowermost part of the electromagnetic-wave machining portion, which is suitable for the rough-finish machining performed for the subsequent precision machining. Thus, the finish machining condition is incorporated in the data on such region, and thereby the machining data is created. Even in this case, it is preferable to refer the data on the each of the sliced portions to the preliminarily-prepared database. For example, referring to a machining database on a surface roughness associated with the electromagnetic-wave machining condition (e.g., database on a correlation between a machining time and a machining surface roughness with respect to the electromagnetic-wave-machining means), the data on the each of the sliced portions is provided with a suitable condition of the finish machining to create the machining data. The term "finish machining" as used herein substantially means a machining for forming a suitable surface roughness that is appropriate for the subsequent precision machining, such machining being performed by scanning an electromagnetic wave in various directions under a reduced irradiation energy condition of an electromagnetic wave.

Figure 23:
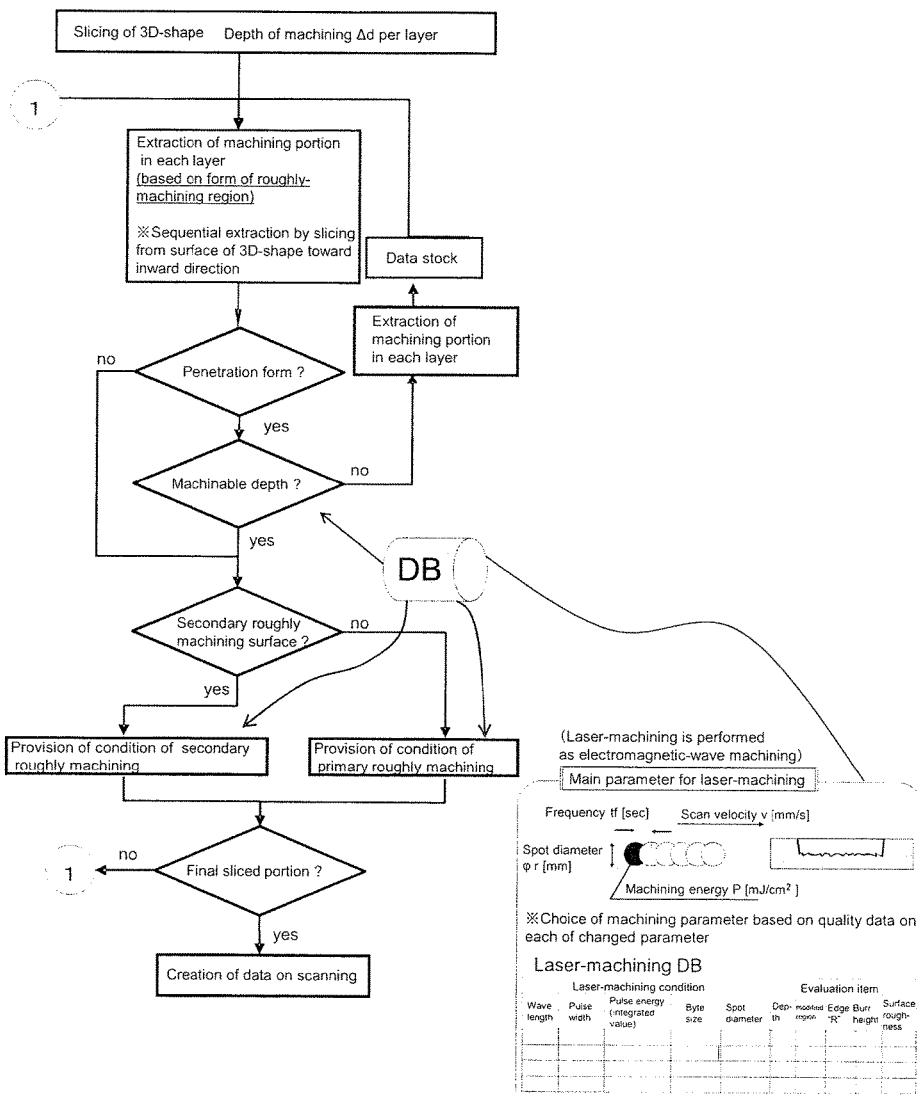
FIG. 23 is a flowchart for the creation of an electromagnetic-wave-machining data.

The creation of the machining data for electromagnetic-wave machining, which is described above, can follow procedures of flowchart as shown in FIG. 23. According to the flowchart of FIG. 23, the machining portion for the electromagnetic-wave-machining means (i.e., rough machining portion) is extracted from each layer corresponding to each of the sliced portions, and then it is determined whether such extracted portion has a form of "penetration". When the extracted portion has the form of "penetration", then it is compared with the machining database to determine whether it is thicker than the machinable depth. When the extracted portion is not thicker than the machinable depth, it is made pending as a stock data, and then another extracted portion of the subsequent layer is similarly evaluated. While on the other hand, when the thickness of the extracted portion(s) reaches the machinable depth, or when the extracted portion does not have the form of "penetration", then it is determined whether it has a secondary rough machining surface (i.e., surface appropriate for the rough-finish machining performed for the subsequent precision machining). When it has the secondary rough machining surface, a condition for the secondary rough machining is provided. On the other hand, when it does not have the secondary rough machining surface, a condition for the depth machining serving as the primary rough machining is provided. Finally, the creation of the data is completed by determining whether the sliced portion (i.e., sliced plane) is final one or not.

Figure 24:
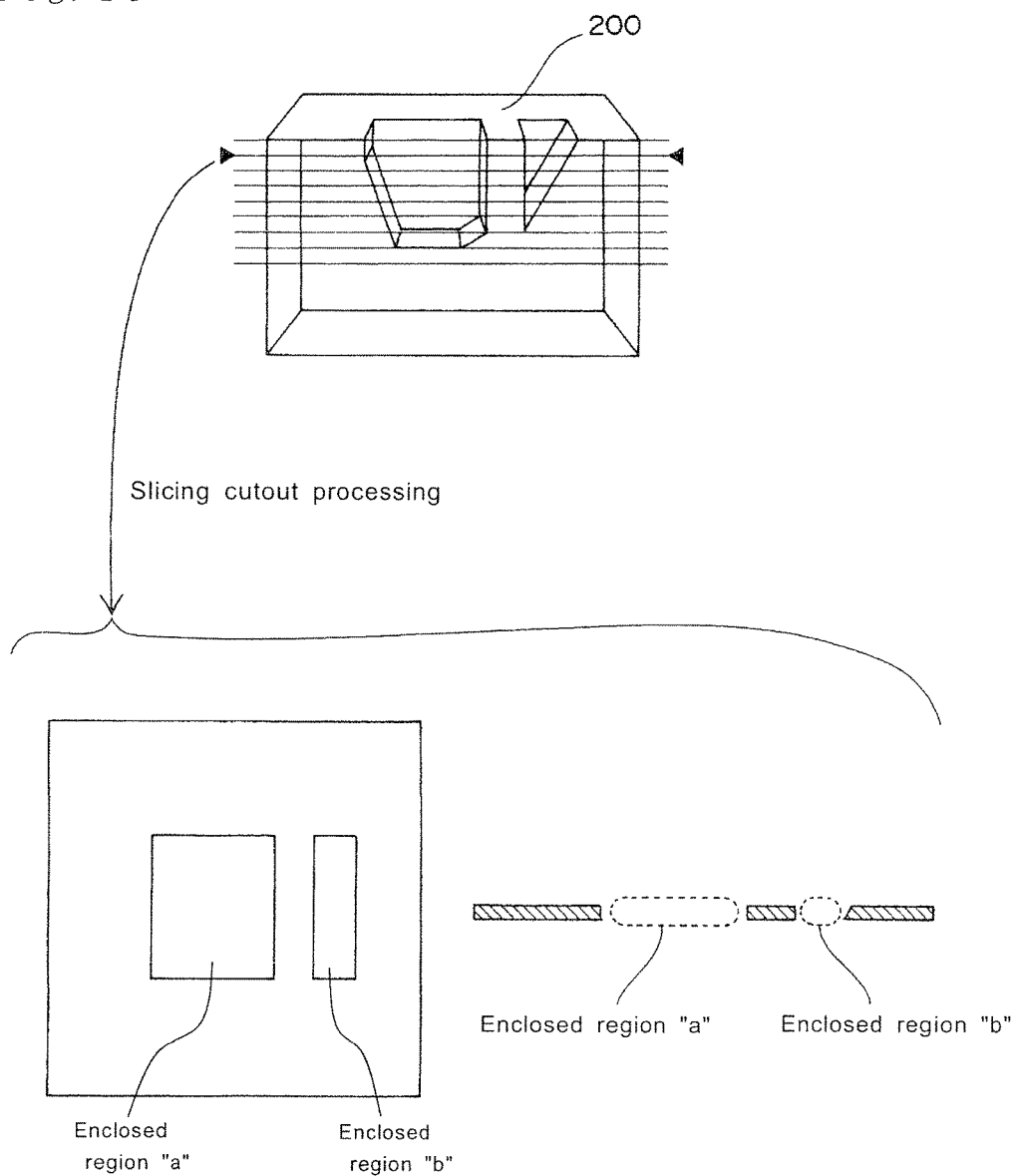
FIG. 24 is views showing the concept of enclosed regions defined as the roughly-machining regions emerged in the each of the sliced portions

The extraction of the machining portion for electromagnetic-wave machining is performed by each of enclosed regions defined as the roughly-machining regions emerged in the each of the sliced portions. That is, the procedures of flowchart as shown in FIG. 23, which are performed for the creation of data, are performed by each of enclosed regions "a" and "b" as shown in FIG. 24.

In order to expand a versatility or convenience, it is preferred in the machining database for reference to have various data on various materials of the workpiece. In other words, it is preferable to have a database on a correlation between the machining condition and the machining depth with respect to each of various materials of the workpiece. This makes it possible to suitably perform the machining process even when the material of the workpiece is changed.

Figure 25A:
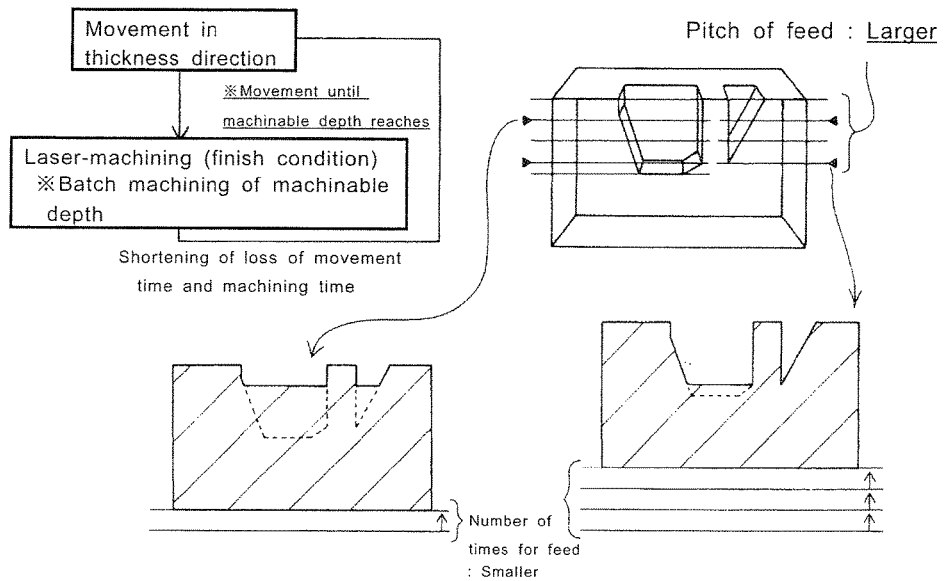
Figure 25B:
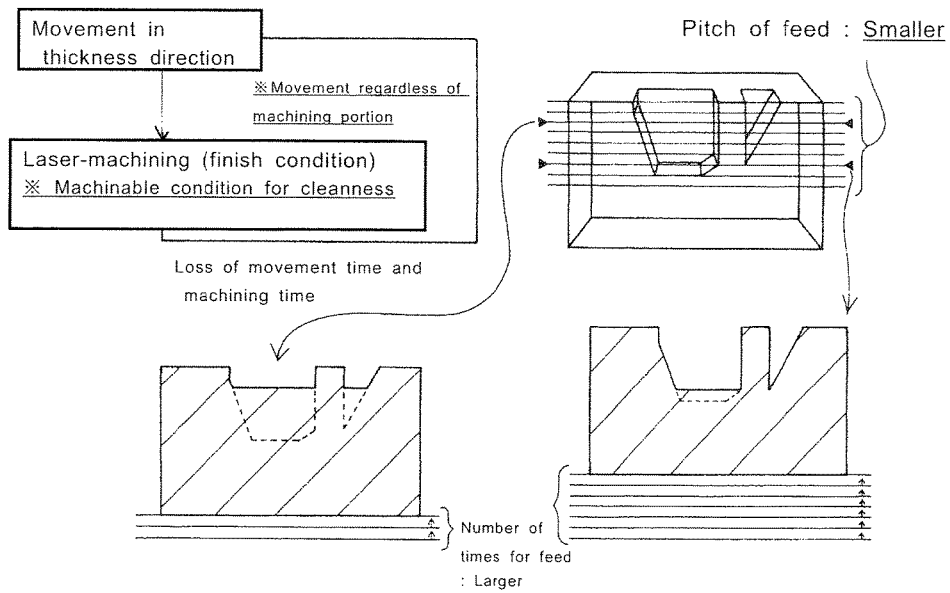

Preferably, in accordance with the machining data, the hybrid ultraprecision machining device establishes a feed of the rough machining performed by the electromagnetic-wave-machining means and/or an electromagnetic-wave-machining condition of the electromagnetic-wave-machining means. In other words, based on the created data for each machining region of the workpiece, it is preferable to transmit information on the thickness-direction feed amount and electromagnetic-wave-machining condition to the hybrid ultraprecision machining device, the information being used for obtaining a final product. Especially with respect to the feed amount, not a constant feed amount during the machining process (i.e., not prior-art feed amount), but larger feed amount upon the depth machining serving as the primary rough machining can be applied (see FIGS. 25A and 25B), which leads to a total reduction in the operation number of times for the machining feed. In general, the performing of the machining feed is required to temporarily stop the machining process of the electromagnetic-wave-machining means, and then change the height of the platform for workpiece. Therefore, the reduction of the operation number of times for the machining feed, which is provided by the present invention, can lead to a shorten time of the entire machining process.

[Hybrid Ultraprecision Machining Device of Present Invention]

Next, a hybrid ultraprecision machining device according to the present invention will be described. The hybrid ultraprecision machining device of the present invention comprises:

an electromagnetic-wave-machining means for roughly machining the workpiece;

a precision-machining means for precisely machining the roughly machined workpiece; and a shape-measurement means for measuring a shape of the workpiece upon use of the electromagnetic-wave machining means and the precision-machining means. Since "electromagnetic-wave-machining means", "precision-machining means" and "shape-measurement means" have been described above, the description thereof is omitted here in order to avoid the duplicated explanation.

The hybrid ultraprecision machining device of the present invention is particularly characterized in that it further comprises a system provided with a memory in which machining data for the machining device is stored. Such machining data is an electromagnetic-wave-machining data obtained by making use of:

information on an original shape corresponding to a shape of the workpiece;

information on a roughly-machining shape to be removed from the workpiece by the electromagnetic-wave-machining means; and a stereoscopic model of an after-electromagnetic-wave-machining shape which is obtained by subtracting the roughly-machining shape from the original shape, wherein the electromagnetic-wave-machining data is created on the basis of information on a plurality of sliced portions which are obtained by partially cutting from the stereoscopic model of the after-electromagnetic-wave-machining shape such that the stereoscopic model is sliced.

Figure 26:
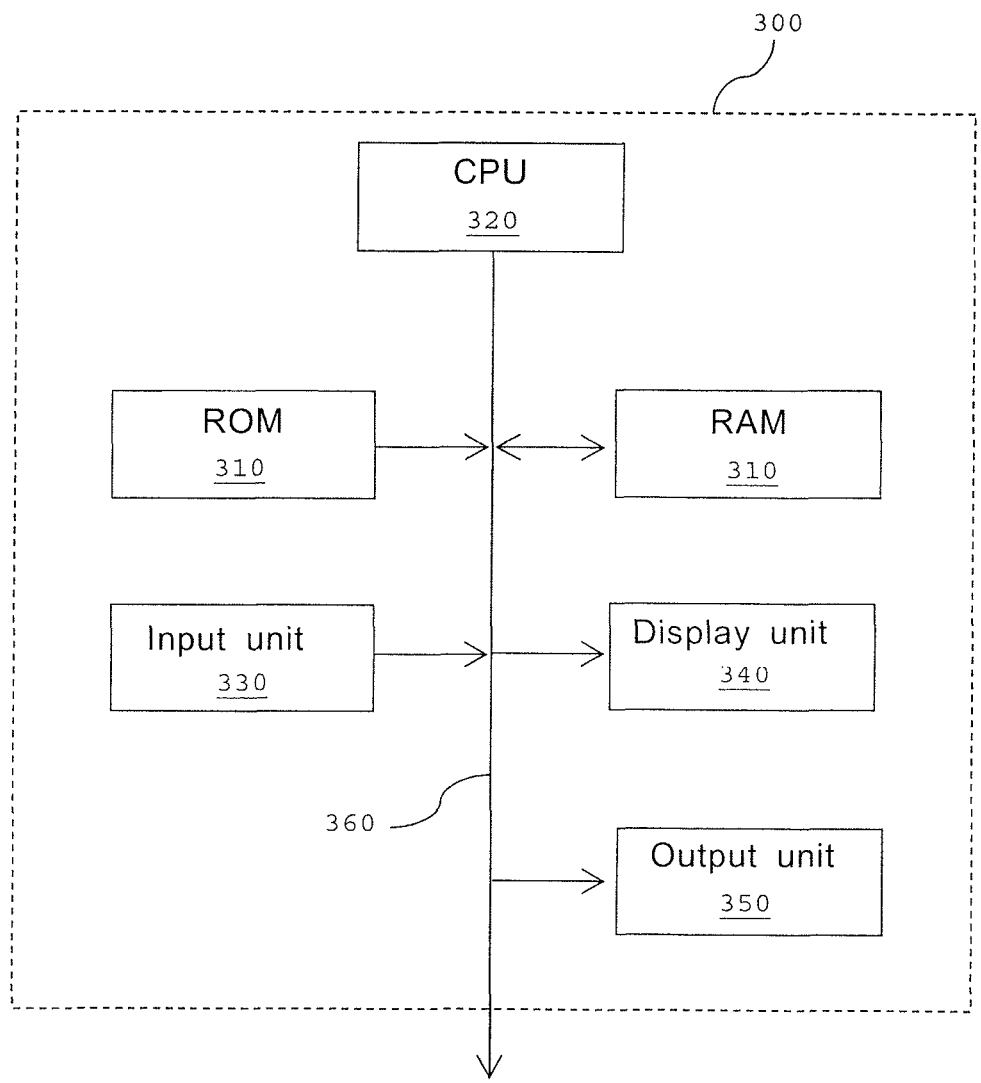
FIG. 26 is a view schematically illustrating a construction of system used in a hybrid ultraprecision machining device according to the present invention.

As shown in FIG. 26, the system 300, which is provided in the hybrid ultraprecision machining device of the present invention, is equipped with a memory 310 such as a primary storage and a secondary storage (e.g., ROM (Read Only Memory) and RAM (Random Access Memory)), a CPU (Central Processing Unit) 320, an input unit 330, a display unit 340, an output unit 350 and a bus 360 serving to connect them with each other. The system 300 may have a form of computer.

The input unit 330 has a pointing device (e.g., keyboard, mouse or touch panel) for an input of various instruction signals. The input signals for various instructions are transmitted to the CPU 320. The ROM serves to store various programs (i.e., programs for implementation of the hybrid ultraprecision machining) which are to be driven by the CPU 320. The RAM serves to store a readout program from the ROM in an implementable state, and also serves to temporarily store the formed program to be temporarily implemented upon the program implementation. The CPU 320 serves to implement the programs of the ROM to control the system 300 as a whole. Particularly, the various programs for implementation of the hybrid ultraprecision machining, which are stored in the ROM, can be implemented by the CPU 320. Such programs may be, for example, ones used for the driving of "electromagnetic-wave-machining means", "precision-machining means" and "shape-measurement means". The display unit 340 has, for example, a LCD (Liquid Crystal Display) or CRT (Cathode Ray Tube) to display various kinds of information transmitted from the CPU 320.

According to the present invention, the memory 310 (e.g., ROM and/or RAM) of the system 300 stores the electromagnetic-wave-machining data obtained by making use of:

information on the original shape corresponding to a shape of the workpiece;

information on the roughly-machining shape to be removed from the workpiece by the electromagnetic-wave-machining means; and the stereoscopic model of the after-electromagnetic-wave-machining shape which is obtained by subtracting the roughly-machining shape from the original shape, wherein the electromagnetic-wave-machining data is created on the basis of information on the plurality of sliced portions which are obtained by partially cutting from the stereoscopic model of the after-electromagnetic-wave-machining shape such that the stereoscopic model is sliced. For the operation of the system 300, the machining data is used by the CPU to implement the programs for the hybrid ultraprecision machining, and thereby the hybrid ultraprecision machining device 100 is suitably driven. During the driving of the device, the control for a suitable electromagnetic-wave machining is performed.

In other words, various data for the creating method of machining data according to the present invention are stored in the memory of the system 300. The memory of the system stores the following data (see FIGS. 19 to 25).

The electromagnetic-wave-machining data obtained by making use of: information on the original shape corresponding to the shape of the workpiece; information on the roughly-machining shape to be removed from the workpiece by the electromagnetic-wave-machining means; and the stereoscopic model of the after-electromagnetic-wave-machining shape which is obtained by subtracting the roughly-machining shape from the original shape, wherein the machining data is created for the electromagnetic-wave machining on the basis of information on the plurality of sliced portions which are obtained by partially cutting from the stereoscopic model of the after-electromagnetic-wave-machining shape such that the stereoscopic model is sliced.

It should be noted that the machining data is provided by the creating method of the present invention which has been described above, and thus may have the following features.

The electromagnetic-wave-machining data is capable of extracting the machining portion such that it is determined whether or not a roughly-machining region of each of the sliced portions has a penetration form penetrating through the each of the sliced portions. See FIGS. 21 and 23.

The electromagnetic-wave-machining data is data in which, when the roughly-machining region has the penetration form penetrating through the each of the sliced portions, data on the each of the sliced portions is combined with another data on an adjacent one of the sliced portions to create the electromagnetic-wave-machining data on the batch machining serving as the primary rough machining of the electromagnetic-wave machining. See FIG. 21 (especially FIGS. 21A and 21B) and FIG. 23.

The electromagnetic-wave-machining data is data in which, when the roughly-machining region of the each of the sliced portions does not have the penetration form penetrating through the each of the sliced portions, data on the each of the sliced portions is provided with a condition of the finish machining to create the electromagnetic-wave-machining data, the finish machining serving as the secondary rough machining of the electromagnetic-wave machining. See FIG. 21 (especially FIG. 21C) and FIG. 23.

The electromagnetic-wave-machining data is capable of creating the machining data by referring the data on the each of the sliced portions to the preliminarily-prepared database. See FIG. 23.

The electromagnetic-wave-machining data is capable of extracting the machining portion by the unit of each of enclosed regions defined as the roughly-machining regions emerged in the each of the sliced portions. See FIG. 24.

The memory for storing "machining data" therein is not limited to the ROM and/or RAM built into the computer, but a removable disk such as an optical memory disk (e.g., CD-ROM) may also be used. In this case, the removable disk can store the electromagnetic-wave-machining data obtained by making use of: information on the original shape corresponding to the shape of the workpiece; information on the roughly-machining shape to be removed from the workpiece by the electromagnetic-wave-machining means; and the stereoscopic model of the after-electromagnetic-wave-machining shape which is obtained by subtracting the roughly-machining shape from the original shape, wherein the machining data is created for the electromagnetic-wave machining on the basis of information on the plurality of sliced portions which are obtained by partially cutting from the stereoscopic model of the after-electromagnetic-wave-machining shape such that the stereoscopic model is sliced. The stored machining data of the removable disk can be read out to be stored in the ROM and/or RAM of the device. Alternatively, another computer of similar kind may have its own memory for storing "machining data". In other words, the ROM of the another computer used for a different purpose from that of the hybrid ultraprecision machining device may store the electromagnetic-wave-machining data obtained by use of: information on the original shape corresponding to the shape of the workpiece; the information on the roughly-machining shape to be removed from the workpiece by the electromagnetic-wave-machining means; and the stereoscopic model of the after-electromagnetic-wave-machining shape which is obtained by subtracting the roughly-machining shape from the original shape, wherein the machining data is created for the electromagnetic-wave machining on the basis of information on the plurality of sliced portions which are obtained by partially cutting from the stereoscopic model of the after-electromagnetic-wave-machining shape such that the stereoscopic model is sliced. In this case, the stored machining data is transmitted from the another computer via a communication network or a removable disk to the system of the hybrid ultraprecision machining device, and then the transmitted data is stored in the ROM and/or RAM of the hybrid ultraprecision machining device.

It should be noted that the present invention as described above includes the following aspects.

The First Aspect: A method for creating machining data for use in a hybrid ultraprecision machining apparatus for manufacturing a micro-machined product from a workpiece, the machining apparatus comprising:

an electromagnetic-wave-machining device for roughly machining the workpiece;

a precision-machining device for precisely machining the roughly machined workpiece; and a shape-measurement device for measuring a shape of the workpiece upon use of the electromagnetic-wave machining device and the precision-machining device, wherein the creation of the machining data makes use of:

information on an original shape corresponding to a shape of the workpiece;

information on a roughly-machining shape to be removed from the workpiece by the electromagnetic-wave-machining device; and a stereoscopic model of an after-electromagnetic-wave-machining shape which is obtained by subtracting the roughly-machining shape from the original shape, wherein the machining data is created for an electromagnetic-wave machining on the basis of information on a plurality of sliced portions which are obtained by partially cutting from the stereoscopic model of the after-electromagnetic-wave-machining shape such that the stereoscopic model is sliced.

The Second Aspect: The method according to the first aspect, wherein a machining portion for the electromagnetic-wave-machining device is extracted on the basis of respective forms of roughly-machining portions emerged in the plurality of sliced portions, in which it is determined whether or not the roughly-machining portion of each of the sliced portions has a penetration form penetrating through the each of the sliced portions.

The Third Aspect: The method according to the second aspect, wherein, when the roughly-machining portion of the each of the sliced portions has the penetration form penetrating through the each of the sliced portions, data on the each of the sliced portions is combined with another data on an adjacent one of the sliced portions to create the machining data on a batch machining serving as a primary rough machining of the electromagnetic-wave machining.

The Fourth Aspect: The method according to the second aspect, wherein, when the roughly-machining portion of the each of the sliced portions does not have the penetration form penetrating through the each of the sliced portions, data on the each of the sliced portions is provided with a condition of a finish machining to create the machining data, the finish machining serving as a secondary rough machining of the electromagnetic-wave machining.

The Fifth Aspect: The method according to the third or fourth aspect, wherein the machining data is created by referring the data on the each of the sliced portions to a preliminarily-prepared database.

The Sixth Aspect: The method according to any one of the first to fifth aspects, wherein the extraction of the machining portion for the electromagnetic-wave-machining device is performed by each of enclosed regions defined as the roughly-machining portions emerged in the each of the sliced portions.

The Seventh Aspect: The method according to the fifth to sixth aspect when appendant to the third or fourth aspect, wherein the hybrid ultraprecision machining apparatus establishes a feed of a rough machining performed by the electromagnetic-wave-machining device and/or an electromagnetic-wave-machining condition of the electromagnetic-wave-machining device, in accordance with the machining data.

The Eighth Aspect: The method according to any one of the first to seventh aspects, wherein the machining apparatus further comprises a controller for controlling the electromagnetic-wave-machining device or the precision-machining device, based on information on the shape of the workpiece, the shape being measured by the shape-measuring device.

The Ninth Aspect: The method according to any one of the first to eighth aspects, wherein the precision-machining device is equipped with a replaceable cutting tool selected from a group consisting of a planar tool, a shaper tool, a fly-cut tool, a diamond-turning tool and a micro-milling tool.

The Tenth Aspect: The method according to any one of the first to ninth aspects, wherein the electromagnetic-wave-machining device is a laser-machining device.

The Eleventh Aspect: The method according to any one of the first to tenth aspects, wherein a micro part of the micro-machined product has a dimension of 10 nm to 15 mm.

The Twelfth Aspect: The method according to the eleventh aspect, wherein the micro-machined product is a metal mold for an optical lens, or an optical lens.

The Thirteenth Aspect: A hybrid ultraprecision machining apparatus for manufacturing a micro-machined product from a workpiece, the machining apparatus comprising:
an electromagnetic-wave-machining device for roughly machining the workpiece;
a precision-machining device for precisely machining the roughly machined workpiece; and
a shape-measurement device for measuring a shape of the workpiece upon use of the electromagnetic-wave machining device and the precision-machining device,
the machining apparatus further comprising a system provided with a memory in which machining data for the machining apparatus is stored,
the machining data is an electromagnetic-wave-machining data obtained by use of:
information on an original shape corresponding to a shape of the workpiece;
information on a roughly-machining shape to be removed from the workpiece by the electromagnetic-wave-machining device; and
a stereoscopic model of an after-electromagnetic-wave-machining shape which is obtained by subtracting the roughly-machining shape from the original shape,
wherein the electromagnetic-wave-machining data is created on the basis of information on a plurality of sliced portions which are obtained by partially cutting from the stereoscopic model of the after-electromagnetic-wave-machining shape such that the stereoscopic model is sliced.

The Fourteenth Aspect: The hybrid ultraprecision machining apparatus according to the thirteenth aspect, wherein the electromagnetic-wave-machining data is data in which an extraction of the machining portion is performed by determining whether or not a roughly-machining portion of each of the sliced portions has a penetration form penetrating through the each of the sliced portions.

The Fifteenth Aspect: The hybrid ultraprecision machining apparatus according to the fourteenth aspect, wherein the electromagnetic-wave-machining data is data in which, when the roughly-machining portion has the penetration form penetrating through the each of the sliced portions, data on the each of the sliced portions is combined with another data on an adjacent one of the sliced portions to create the electromagnetic-wave-machining data on a batch machining serving as a primary rough machining of the electromagnetic-wave machining.

The Sixteenth Aspect: The hybrid ultraprecision machining apparatus according to the fourteenth aspect, wherein the electromagnetic-wave-machining data is data in which, when the roughly-machining portion of the each of the sliced portions does not have the penetration form penetrating through the each of the sliced portions, data on the each of the sliced portions is provided with a condition of a finish machining to create the electromagnetic-wave-machining data, the finish machining serving as a secondary rough machining of the electromagnetic-wave machining.

Although a few embodiments of the present invention have been hereinbefore described, the present invention is not limited to these embodiments. It will be readily appreciated by those skilled in the art that various modifications are possible without departing from the scope of the present invention.

The present invention has been described based on such an embodiment that the precision-machining means is equipped with the replaceable cutting tool selected from the group consisting of the planar tool, the shaper tool, the fly-cut tool, the diamond-turning tool and the micro-milling tool. The present invention, however, is not necessarily limited to this embodiment. For example, the precision machining means may be equipped also with a replaceable grinding tool. That is, in addition to or instead of the above cutting tool, the grinding tool may be also replaceable in the precision machining means. The use of the grinding tool leads to an achievement of the high-precision machining. Typically, a grindstone is used as the grinding tool. The grinding of the surface of the workpiece can be performed by bringing the rotating grindstone into contact with the workpiece (see FIG. 18). Examples of abrasive grain material used for the grindstone include a diamond, a cubic crystal boron nitride (cBN), an alumina and a silicon carbide (SiC), for example. Resin bond grindstone, metal bond grindstone, or metal resin grindstone may also be used. Furthermore, the precision machining means may be equipped also with a replaceable horn for ultrasonic machining, a replaceable tool for ultrasonic vibration cutting, a replaceable grinding tool for polishing, or a replaceable micro drill.

Cutting oil for lubrication may be supplied to the tip edge of the tool in order to improve a cutting performance of the cutting tool and reduce the wear of the tool. The kind of the cutting oil is not specifically limited, and thus any suitable oils for the conventional cutting processes may be used.

As an additional remark, the present invention further provides a method for creating machining data in a hybrid ultraprecision machining method for manufacturing a micro-machined product from a workpiece,
the machining method comprising the steps of:
(i) subjecting the workpiece to an electromagnetic-wave-machining process, and thereby roughly machining the workpiece; and
(ii) subjecting the roughly machined workpiece to a precision-machining process,
wherein, a shape of the workpiece is measured upon at least one of the steps (i) and (ii),
wherein the creation of the machining data makes use of:
information on an original shape corresponding to a shape of the workpiece;
information on a roughly-machining shape to be removed from the workpiece by the step (i) of the electromagnetic-wave-machining; and
a stereoscopic model of an after-electromagnetic-wave-machining shape which is obtained by subtracting the roughly-machining shape from the original shape,
wherein an electromagnetic-wave-machining data is created on the basis of information on a plurality of sliced portions which are obtained by partially cutting from the stereoscopic model of the after-electromagnetic-wave-machining shape such that the stereoscopic model is sliced. Since the advantageous effect and the content of this method are true of those of the above inventions, the description thereof is omitted here in order to avoid the duplicated explanation.

EXAMPLES

Some confirmatory tests were conducted to confirm the effects of the hybrid ultraprecision machining device on which the determining method of the machining means according to the present invention is based.

<<Case A>>

Figure 28A:
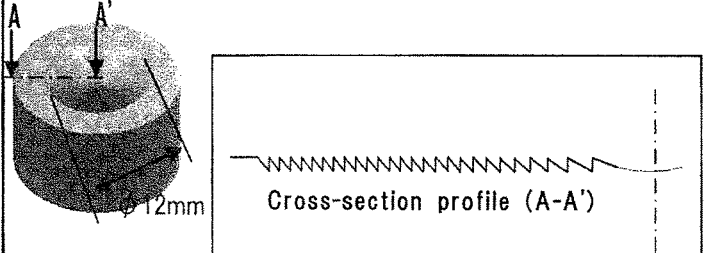

A machining method of the prior art (Comparative example 1) and a machining method of the present invention (Example 1) were performed to manufacture a metal mold for fresnel lens as shown in FIG. 28A.

Comparative Example 1

As for the machining method of the prior art, only the cutting machining was performed over the whole processes in order to produce the metal mold for fresnel lens from a difficult-to-cut material. The outline on the machining method of the prior art is shown in Table 1.

TABLE 1

| | Comparative example 1 (Method of Prior Art) | | | |
|---|---|---|---|---|
| | Rough machining (Electric discharge machining) | Finishing allowance | Finishing (Cutting and Grinding) | Total |
| Machining time | — | → | 80 H | 80 H |
| Note (Problems) | Workpiece had its edge broken due to its micro shape, and electric discharge machining was impossible because its bottom was not able to be machined. | — | Processes from rough machining to finishing were performed. The number of dressing due to the wear of tool (i.e., grindstone) needed to be 10 or more. Final finishing was performed by cutting to ensure the edge of the workpiece bottom. Surface roughness Rz: 100 nm or less | |

As shown in the most right column of Table 1, it was found that the method of the prior art had taken "80 hours" to produce the metal mold for fresnel lens shown in FIG. 28A.

Example 1

In Example 1 of the present invention, a workpiece was roughly cut by laser machining, and thereafter the roughly cut workpiece was micro-machined to produce the metal mold for fresnel lens. The outline on Example 1 is shown in Table 2. As the shape measurement means in Example 1, the arranged position of lens was measured by a CCD camera, and the shape of the workpiece was measured by optical interferometry using a laser light. For the surface roughness measurement of the workpiece, white-light interferometry measurement (optical interference) was performed.

TABLE 2

| | Example 1 (Present Invention) | | | |
|---|---|---|---|---|
| | Rough machining (Laser machining) | Finishing allowance | Finishing (Cutting and Grinding) | Total |
| Machining time | 16 H | → | 5 H | 21 H |
| Note (Effects) | It was possible to perform a rough machining of the shape which had been regarded as being impossible to be machined. This lead to a reduction of machining time. Surface roughness: Rz 3 to 10 μm Machined shape accuracy: ≤±10 μm | 5 μm to 10 μm | No rough cutting and no semi-finishing by grinding machining were needed. It was possible to finish-machine the workpiece only by cutting machining. Surface roughness Rz: 100 nm or less | |

As shown in the most right column of Table 2, it was found that the machining method of the present invention had taken "21 hours" to produce the metal mold for fresnel lens shown in FIG. 28A.

It is concluded that, as for the production of the same metal mold for fresnel lens, the present invention can reduce the manufacturing time by about 74% as compared to that of the prior art (see Table 3).

TABLE 3

| Comparative example 1 Machining time | Example 1 Machining time | Rate of reduction in time |
|---|---|---|
| 80 H | 21 H | 74% |

<<Case B>>

Figure 28B:
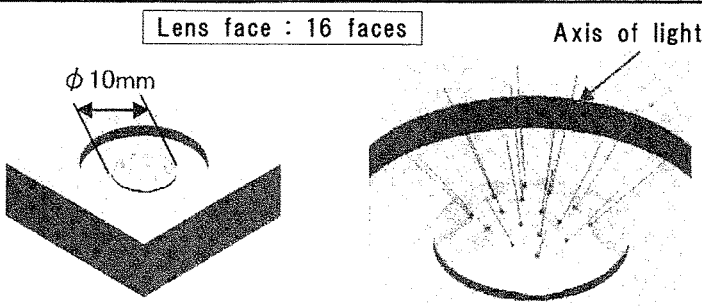

A machining method of the prior art (Comparative example 2) and a machining method of the present invention (Example 2) were performed to manufacture a metal mold for multiple lens as shown in FIG. 28B.

Comparative Example 1

As for the machining method of the prior art, the electric discharge machining was performed with respect to the workpiece, followed by the cutting machining to produce a metal mold for multiple lens from a difficult-to-cut material. The outline on the machining method of the prior art is shown in Table 4.

TABLE 4

Comparative example 2 (Method of Prior Art)

| | Rough machining (Electric discharge machining) | Finishing allowance | Finishing (Cutting and Grinding) | Total |
|---|---|---|---|---|
| Machining time | Production of electrodes: 48 H<br>Electric discharge machining: 40 H<br>Total: 88 H | 100 to 50 μm | 64 H | 152 H |
| Note (Problems) | Workpiece was inclined for each optical axis to perform electrical discharge machining. Surface roughness: Rz 2 to 4 μm | | Positioning structure dedicated to set the metal mold was needed (in alignment with the electric discharge machining surface). Workpiece was inclined for each optical axis and subjected to grinding machining. The number of dressing due to the wear of grindstone was 32. Surface roughness: Rz 100 nm or less | |

As shown in the most right column of Table 4, it was found that the method of the prior art had taken "152 hours" to produce the metal mold for multiple lens shown in FIG. 28E.

Example 2

In Example 2 of the present invention, a workpiece was roughly cut by laser machining, and thereafter the roughly cut workpiece was micro-machined to produce the metal mold for multiple lens. The outline on Example 2 is shown in Table 5. As for Example 2, the shape of the workpiece was measured by optical interferometry using a laser light. For the surface roughness measurement of the workpiece, "white-light interferometry measurement" (optical interference) was performed.

TABLE 5

Example 2 (Present Invention)

| | Rough machining (Laser machining) | Finishing allowance | Finishing (Cutting and Grinding) | Total |
|---|---|---|---|---|
| Machining time | 20 H | → | 8 H | 28 H |
| Note (Effects) | Laser axis needed to be matched with optical axis in order to ensure machining accuracy. Machining time was able to be reduced since a finishing allowance was able to be decreased and no tool matching the shape of the workpiece was needed as compared to the case of electric discharge machining. Surface roughness: Rz 3 to 10 μm Machined shape accuracy: ≤±10 μm | 5 μm to 10 μm | No metal mold setting step (aligning step) was needed since laser and cutting machinings were available in the same machine. Matching between optical axis and tool axis was able to be automatically controlled by multiaxis control to ensure the machining accuracy. Surface roughness: Rz 100 nm or less | |

As shown in the most right column of Table 5, it was found that the machining method of the present invention had taken "28 hours" to produce the metal mold for multiple lens shown in FIG. 28B.

It is concluded that, as for the production of the same metal mold for multiple lens, the present invention can reduce the manufacturing time by about 82% as compared to that of the prior art (see Table 6).

TABLE 6

| Comparative example 2 Machining time | Example 2 Machining time | Rate of reduction in time |
|---|---|---|
| 152 H | 28 H | 82% |

<<Generalization>>

As can be seen from the results of the cases A and B, the present invention can reduce the manufacturing time by 70 to 80% as compared to those of the prior art wherein the microstructure is manufactured from the difficult-to-cut material. Accordingly, it is understood that the present invention can provide significantly advantageous effects for the manufacture of the micro product with the fine structure.

<<Confirmatory Test for Significance of Creating Method of Machining Data>>

The simulation was conducted to confirm the effect of the creating method of the machining data according to the present invention.

With respect to a simulation model as shown in FIG. 29, the total machining time was evaluated between "prior art" and "new method (present invention)".

Specifically, such evaluation was conducted under such a condition that the same laser machining was applied between "prior art" and "new method (present invention)", and the batch machinable depth of the laser irradiation was 20 μm (see FIG. 29). As a result, it was found as shown in Table 7 that the total machining time for "prior art" was about 6700 seconds, whereas the total machining time for "new method (present invention)" was about 3400 seconds (see FIG. 30). That is, it concluded that the new method of the present invention can reduce the total machining time more greatly than that of the prior art.

TABLE 7

|  | Prior art | New method (Present invention) |
|---|---|---|
| Machining time | 6700 seconds | 3400 seconds |

Therefore, it can be appreciated that the present invention makes it possible to effectively shorten the required time for manufacturing the final product from the workpiece.

INDUSTRIAL APPLICABILITY

The present invention makes it possible to provide a micro-machined product from a workpiece. In particular, there can be provided a metal mold for any kinds of parts and molded products, all of which achieve the miniaturization and high functionality.

CROSS REFERENCE TO RELATED PATENT APPLICATION

The present application claims the right of priority of Japanese Patent Application No. 2011-273091 (filed on Dec. 14, 2011, the title of the invention: "METHOD FOR CREATING MACHINING DATA FOR USE IN HYBRID ULTRAPRECISION MACHINING DEVICE, AND HYBRID ULTRAPRECISION MACHINING DEVICE"), the disclosure of which is incorporated herein by reference.

EXPLANATION OF REFERENCE NUMERALS

10 Electromagnetic-wave-machining means
15 Laser-machining means
15a Laser incident light
30 Precision-machining means
30a Tip of tool
31 Sliding platform
32 Motor for vertical-axis movement
33 Machining head
34 Shaper tool
35 Fly-cut tool
36 Diamond-turning tool
36a Vacuum chuck
36b Air spindle
36c Induction motor
36d Servomotor
37 Micro-milling tool
38 Grinding tool
38a Grinding tool (Diamond grindstone)
38b Truing grindstone
50 Shape-measurement means
52 Shooting means/Imaging means (Shape-measurement means)
54 Detector by laser light (Shape-measurement means)
80 Workpiece
81 Roughly machined workpiece
82 Roughly machined and subsequently precisely machined workpiece (i.e., micro-machined product)
82a Micro part of micro-machined product
85 Table for mounting workpiece
90 Computing means (e.g., computer)
100 Hybrid ultraprecision machining device
200 Stereoscopic model of after-electromagnetic-wave-machining shape which is obtained by subtracting roughly-machining shape from original shape of workpiece
300 System for hybrid ultraprecision machining device
310 Memory
320 CPU
330 Input unit
340 Display unit
350 Output unit
360 Bus

The invention claimed is:

1. A method for creating machining data for use in a hybrid ultraprecision machining apparatus for manufacturing a micro-machined product from a workpiece, the machining apparatus including: a laser-machining tool configured to roughly machine the workpiece; a cutting tool configured to precisely machine the roughly machined workpiece; and a shape-measurement device, including one of a camera and a detector, configured to measure a shape of the workpiece upon use of the laser-machining tool and the cutting tool,
the method comprising:
creating the machining data utilizing information including:
information regarding an original shape corresponding to a shape of the workpiece;
information regarding a roughly-machining shape to be removed from the workpiece by the laser-machining tool; and
information regarding a stereoscopic model of an after-laser-machined shape, which is obtained by removing the information regarding the roughly-machining shape from the information regarding the original shape;
creating the machining data for laser machining on the basis of information regarding a plurality of sliced portions, which are obtained by slicing the stereoscopic model of the after-laser-machined shape; and
extracting a machining portion to be roughly machined by the laser-machining tool on the basis of a form of a roughly-machining region appearing in each sliced portion of the plurality of sliced portions, by determining whether or not the roughly-machining region in the sliced portion penetrates a thickness of the sliced portion,
wherein, when it is determined that the roughly-machining region in the sliced portion penetrates the thickness of the sliced portion, information on a form of roughly-machining region appearing in the sliced portion is combined with information on a form of roughly-machining region appearing in an adjacent sliced portion of the plurality of sliced portions, to create the machining data regarding a primary rough machining of the laser machining, so that the roughly-machining region appearing in the sliced portion and the roughly-machining region appearing in the adjacent sliced portion are removed at one time, and
when it is determined that the roughly-machining region in the sliced portion does not penetrate the thickness of the sliced portion, the information on a form of roughly machining region appearing in the sliced portion is provided with a condition of a secondary rough machining of the laser machining, in which a rough-finish machining of the laser machining is performed.

2. The method according to claim 1, wherein the machining data is created by referring the information on a form of roughly machining region appearing in each of the plurality of sliced portions to a preliminarily-prepared database.

3. The method according to claim 1, wherein the machining portion is extracted for each of enclosed regions defined as the roughly-machining regions appearing in each of the plurality of sliced portions.

4. The method according to claim 2, wherein the hybrid ultraprecision machining apparatus establishes a feed of a rough machining performed by the laser-machining tool and/or a laser machining condition of the laser-machining tool, in accordance with the machining data.

5. The method according to claim 1, wherein, the hybrid ultraprecision machining apparatus further includes a controller configured to control the laser-machining tool or the cutting tool, based on information regarding the shape of the workpiece, the shape being measured by the shape-measuring device.

6. The method according to claim 1, wherein the cutting tool is equipped with a replaceable cutting tool selected from a group consisting of a planar tool, a shaper tool, a fly-cut tool, a diamond-turning tool and a micro-milling tool.

7. The method according to claim 1, wherein the laser-machining tool includes at least one of a solid-state laser, a fiber laser, a gas laser.

8. The method according to claim 1, wherein a micro part of the micro-machined product has a dimension of 10 nm to 15 mm.

9. The method according to claim 8, wherein the micro-machined product is a metal mold for an optical lens, or an optical lens.

10. The method for creating machining data according to claim 1, wherein the machining data is generated such that the form of the roughly machining region of each of the sliced portions is determined as to whether such roughly machining region is suitable for depth batch machining, as a primary rough machining, or is suitable for finishing machining, as a secondary rough machining.

11. The method for creating machining data according to claim 1, wherein, whether the roughly machining region penetrates or does not penetrate a thickness of the sliced portion is determined based on a total depth of the roughly machining shape and the thickness and a location of the sliced portion with respect to the total depth.

12. The method for creating machining data according to claim 1, wherein the plurality of sliced portions are obtained by partially cutting, from the stereoscopic model, in a direction transverse to a thickness direction of the stereoscopic model, such that the stereoscopic model is sequentially sliced in a direction from a surface of the stereoscopic model towards an interior of the stereoscopic model.

13. The method for creating machining data according to claim 1, wherein the machineable depth is compared with a total sequential thickness of a plurality of adjacent sliced portions, and when a total sequential thickness of the plurality of adjacent sliced portions is less than the machineable depth, it is determined that the roughly machining portion penetrates the thickness of the plurality of adjacent sliced portions.

14. A hybrid ultraprecision machining apparatus for manufacturing a micro-machined product from a workpiece, the machining apparatus comprising:
a laser-machining tool that roughly machines the workpiece;
a cutting tool that precisely machines the roughly machined workpiece;
a shape-measurement device, including at least one of a camera and a detector, that measures a shape of the workpiece upon use of the laser-machining tool and the cutting tool,
a memory that stores machining data for the hybrid ultraprecision machining apparatus; and
a processor, when executing a program stored in the memory, that creates the machine data,
wherein the machining data includes laser machining data obtained by utilizing:
information regarding an original shape corresponding to a shape of the workpiece;
information regarding a roughly-machining shape to be removed from the workpiece by the laser-machining tool; and
information regarding a stereoscopic model of an after-laser-machined shape, which is obtained by removing the information regarding the roughly-machining shape from the information regarding the original shape,
wherein the processor creates the laser machining data on the basis of information regarding a plurality of sliced portions, which are obtained by slicing the stereoscopic model of the after-laser-machined shape, and
wherein the processor extracts a machining portion to be roughly machined by the laser-machining tool, by determining whether or not a roughly-machining region in each sliced portion of the plurality of sliced portions penetrates a thickness of the sliced portion,
wherein, when it is determined that the roughly-machining region in the sliced portion penetrates the thickness of the sliced portion, the processor combines information on a form of roughly-machining region appearing in the sliced portion with information on a form of roughly-machining region appearing in an adjacent sliced portion of the plurality of sliced portions, to create the laser-machining data regarding a primary rough machining of the laser machining, so that the roughly-machining region appearing in the sliced portion and the roughly-machining region appearing in the adjacent sliced portion are removed at one time, and
when it is determined that the roughly-machining region in the sliced portion does not penetrate the thickness of the sliced portion, the processor provides the information on a form of roughly machining region appearing in the sliced portion with a condition of a secondary rough machining of the laser machining, in which a rough-finish machining of the laser machining is performed.

15. The hybrid ultraprecision machining apparatus according to claim 14, wherein the shape-measurement device comprises one of a CCD camera, an infrared camera, a near-infrared camera, a mid-infrared camera, an X-ray camera, a white light interferometry and a scanning probe microscope.

16. The hybrid ultraprecision machine apparatus according to claim 14, wherein the rough-finish machining is performed by scanning an electromagnetic wave having a reduced irradiation energy in various directions, to form a suitable surface roughness that is appropriate for a subsequent precision machining by the cutting tool.

17. The hybrid ultraprecision machining apparatus according to claim 14, wherein the machining data is generated such that the form of the roughly machining region of each of the sliced portions is determined as to whether such roughly machining region is suitable for depth batch machining, as a primary rough machining, or is suitable for finishing machining, as a secondary rough machining.

18. The hybrid ultraprecision machining apparatus according to claim 14, wherein, whether the roughly machining region penetrates or does not penetrate a thickness of the sliced portion is determined based on a total depth of the roughly machining shape and the thickness and a location of the sliced portion with respect to the total depth.

19. The hybrid ultraprecision machining apparatus according to claim 14, wherein the plurality of sliced portions are obtained by partially cutting, from the stereoscopic model, in a direction transverse to a thickness direction of the stereoscopic model, such that the stereoscopic model is sequentially sliced in a direction from a surface of the stereoscopic model towards an interior of the stereoscopic model.

20. The hybrid ultraprecision machining apparatus according to claim 14, wherein the machineable depth is compared with a total sequential thickness of a plurality of adjacent sliced portions, and when a total sequential thickness of the plurality of adjacent sliced portions is less than the machineable depth, it is determined that the recognition portion penetrates the thickness of the plurality of adjacent sliced portions.

\* \* \* \* \*